Patented Aug. 25, 1925.

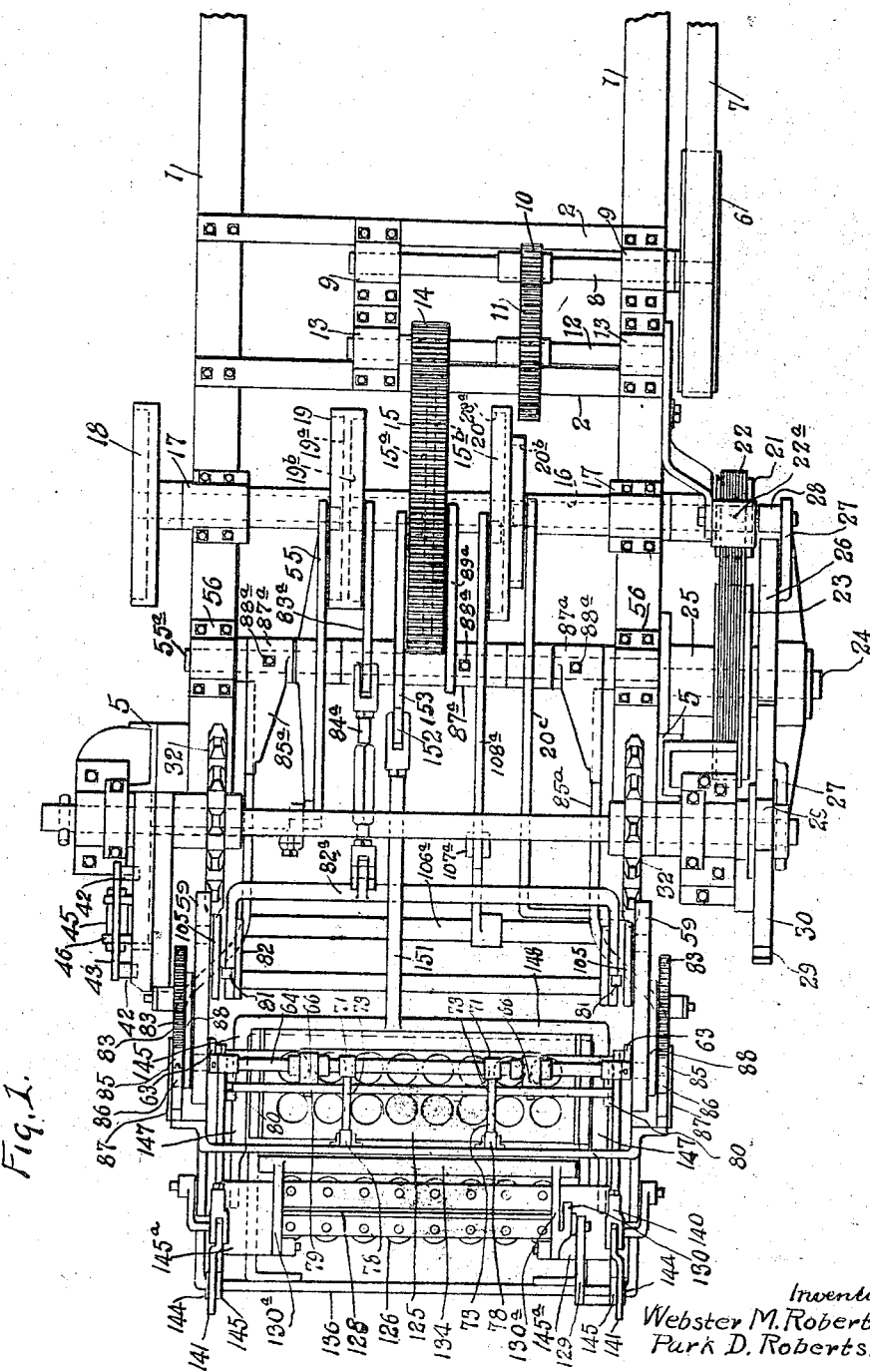

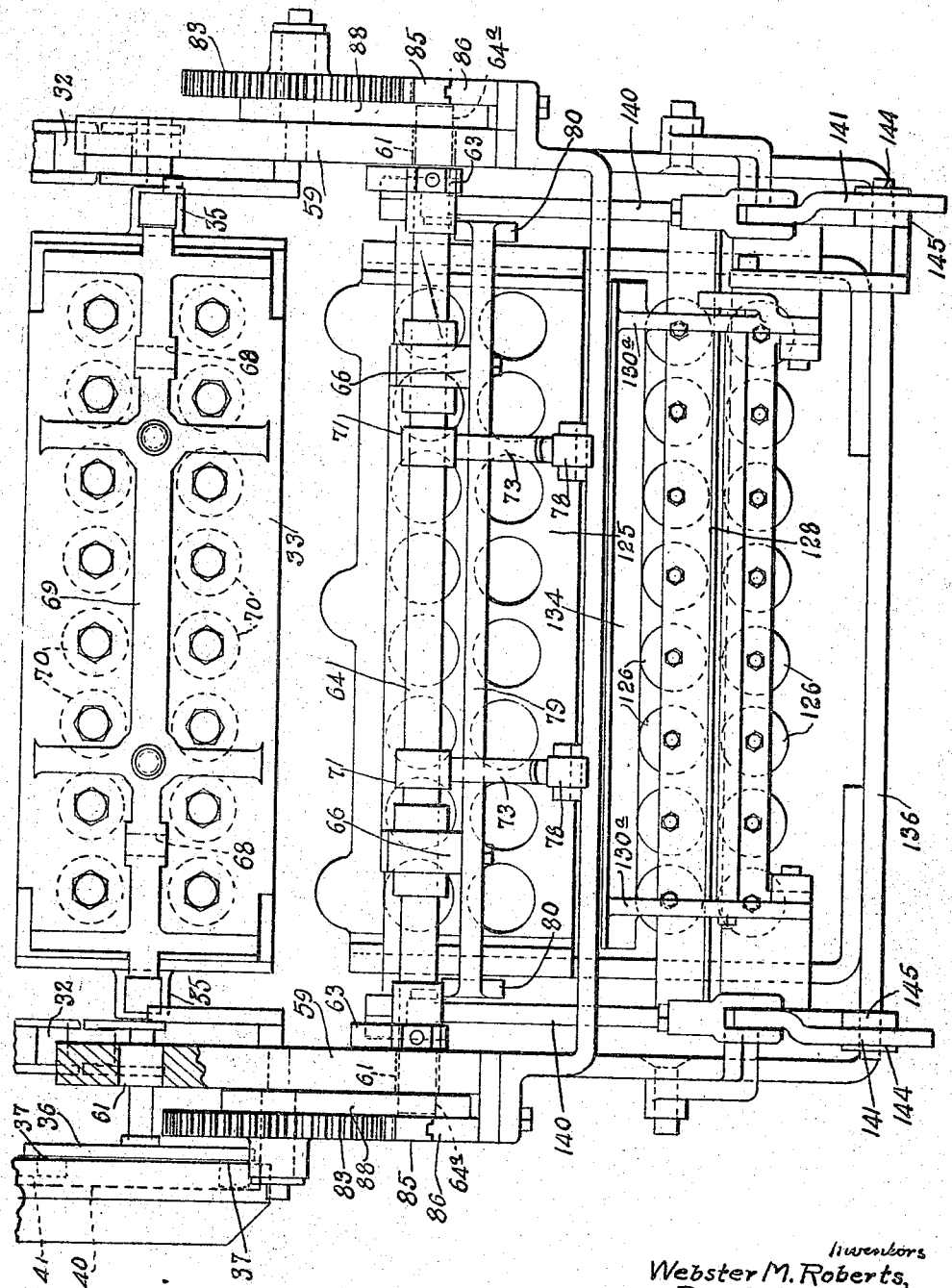

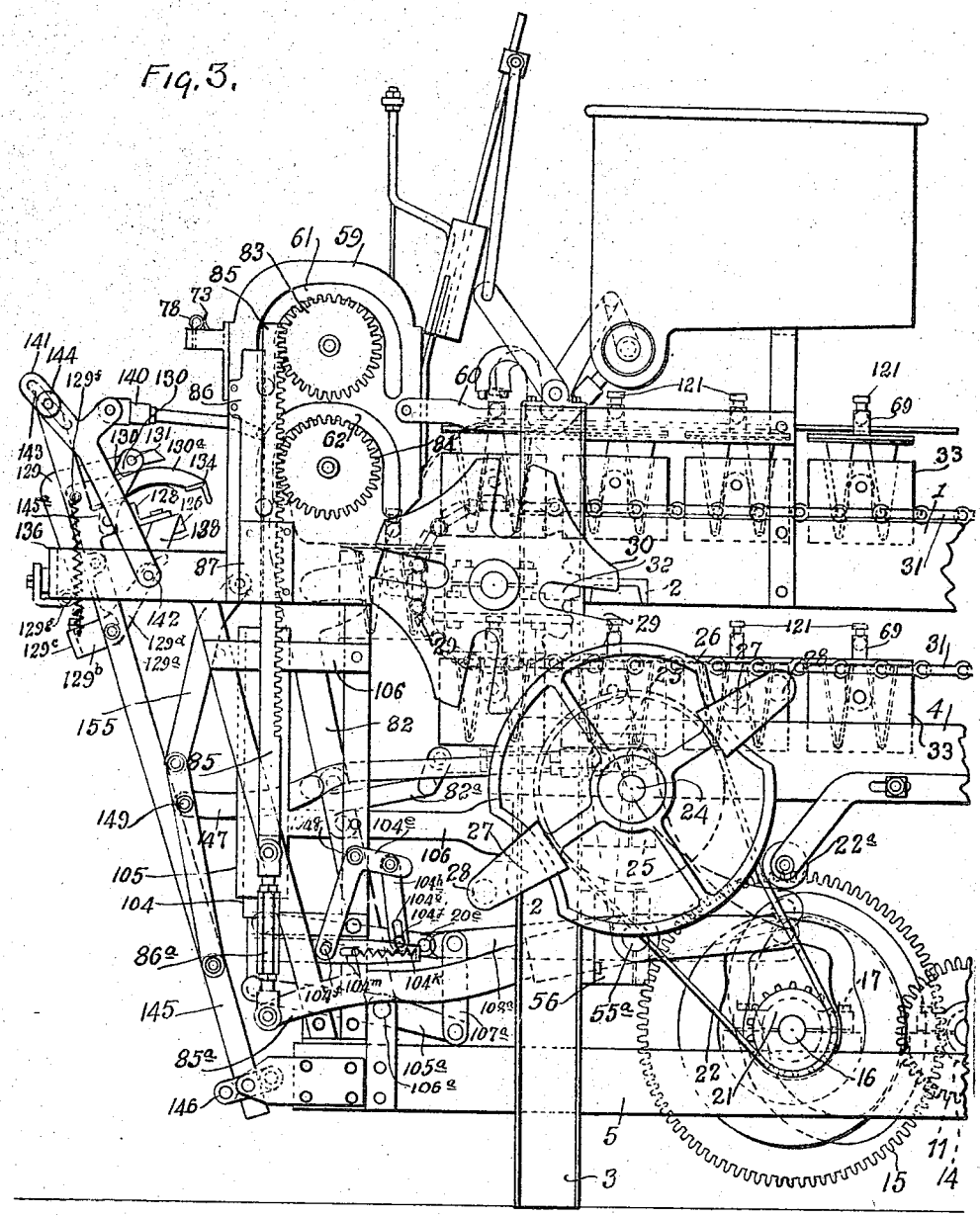

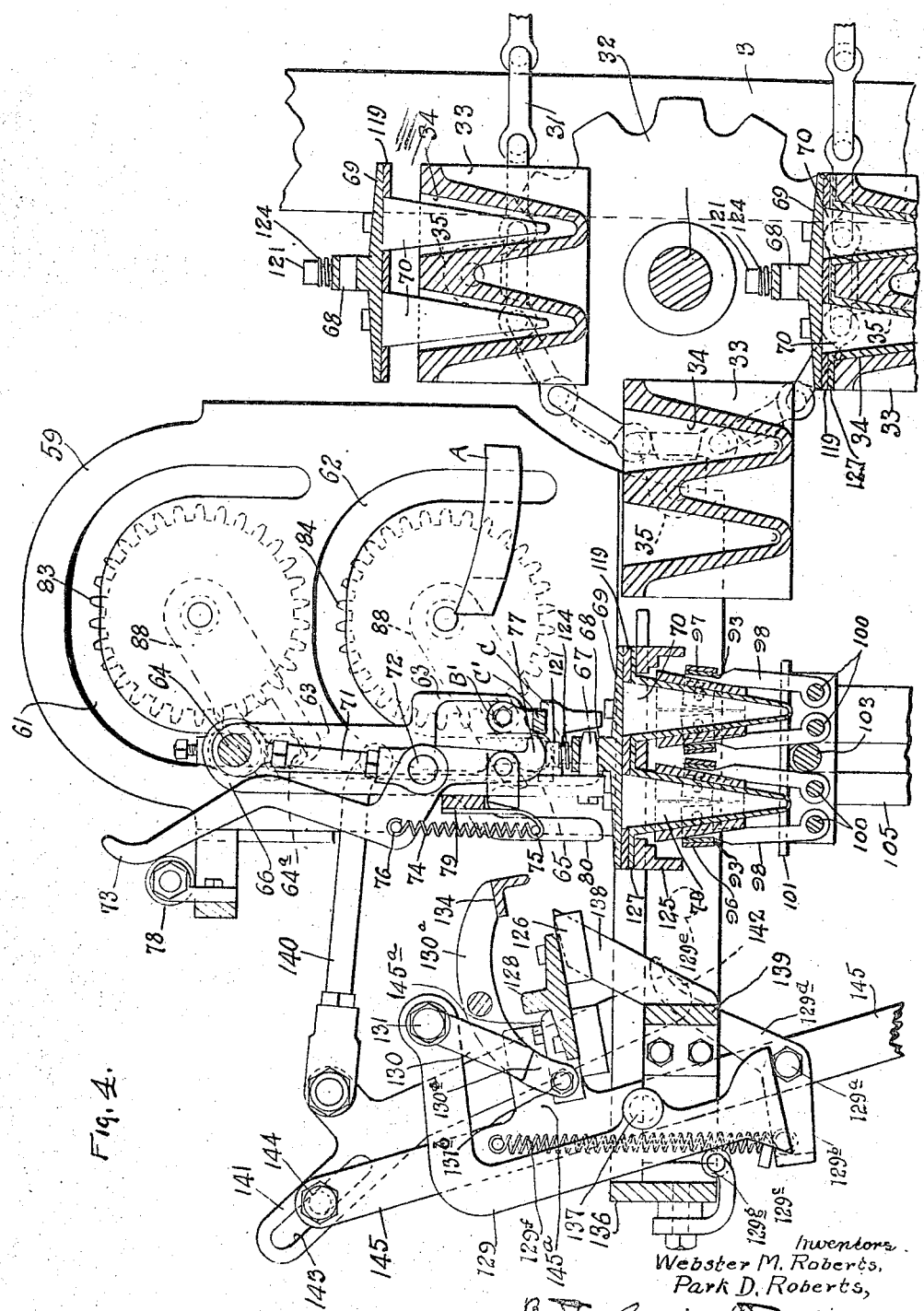

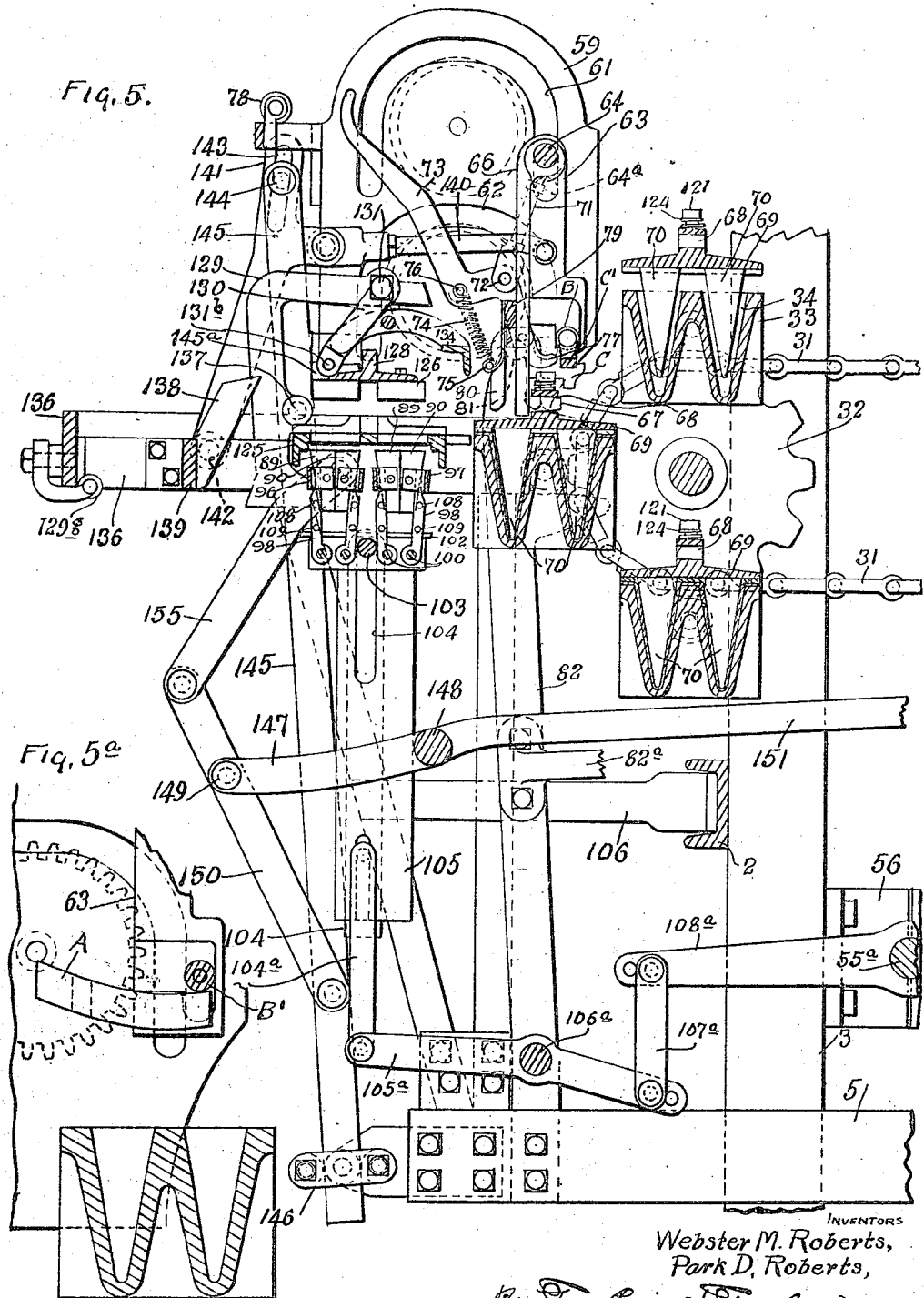

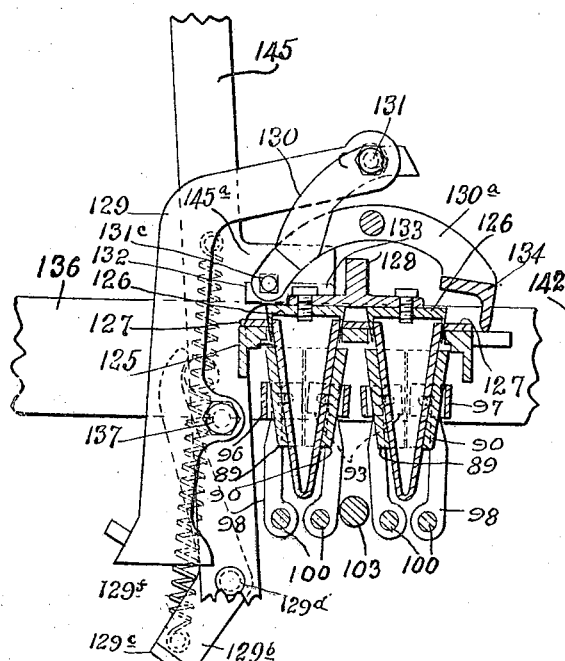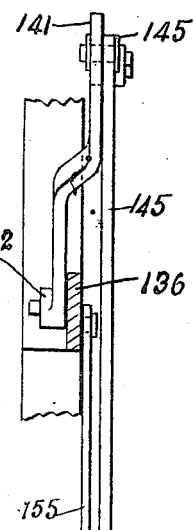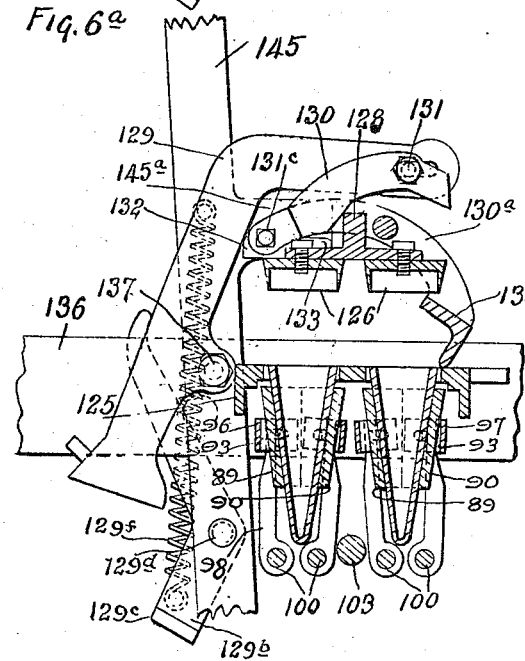

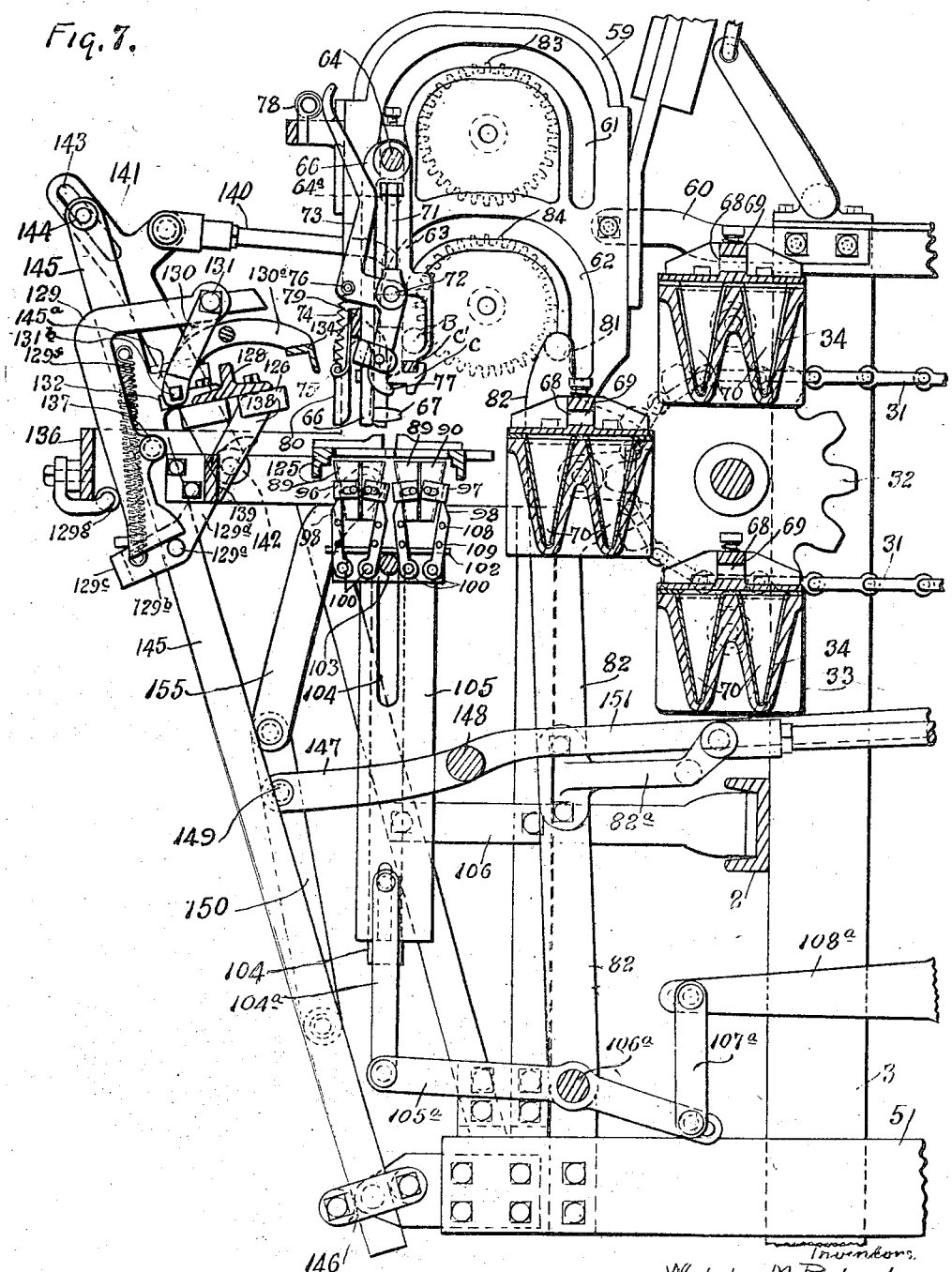

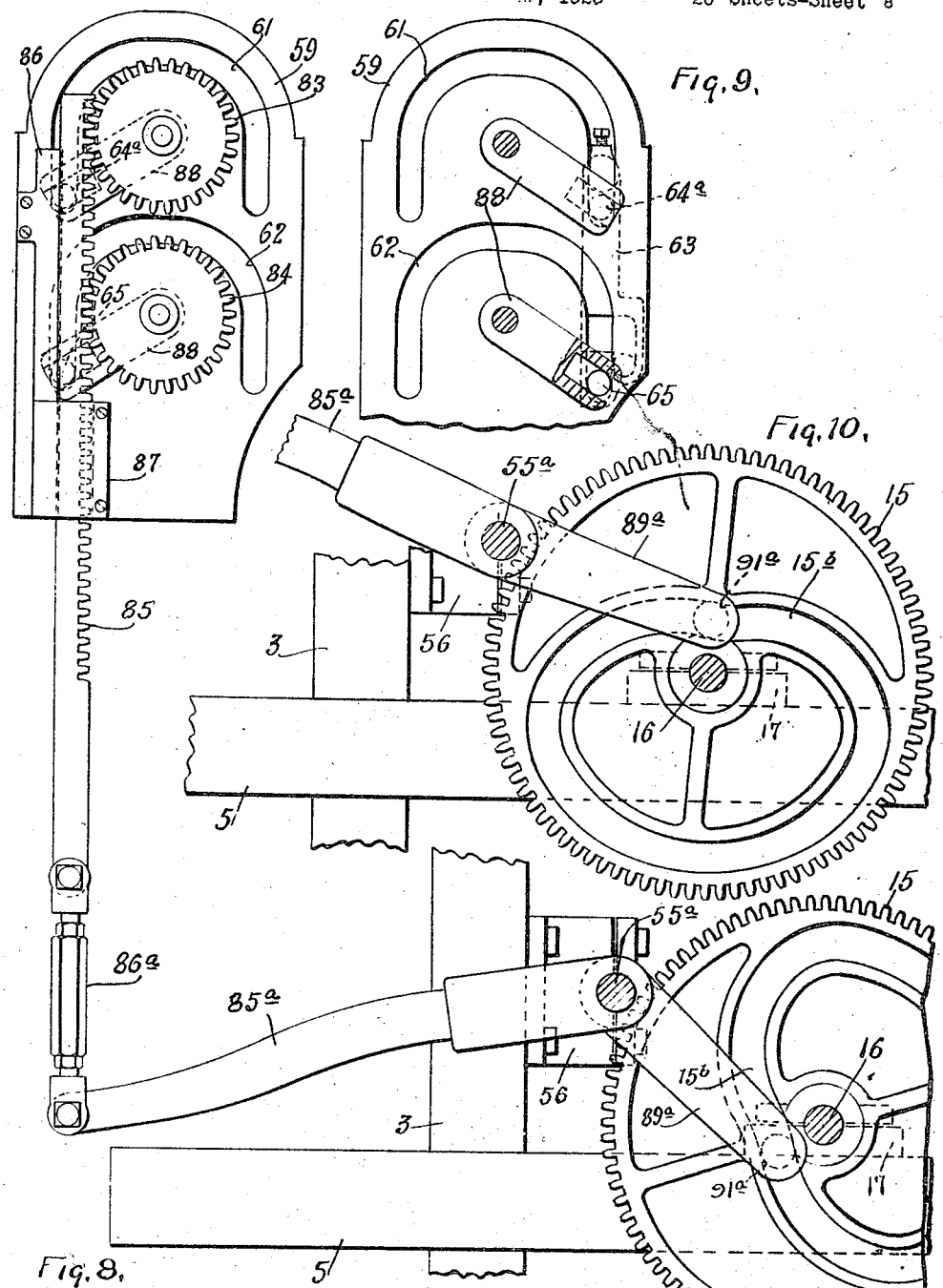

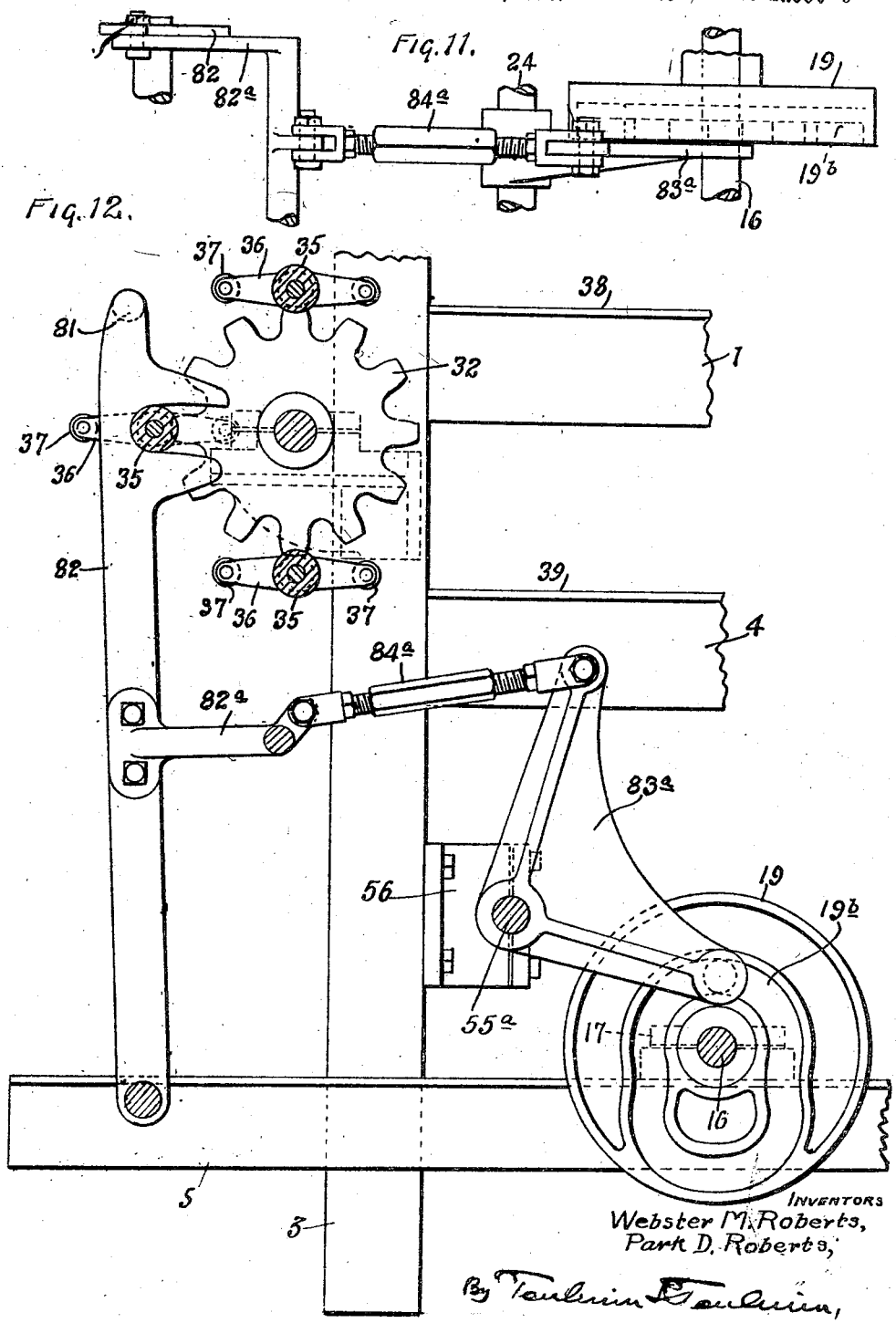

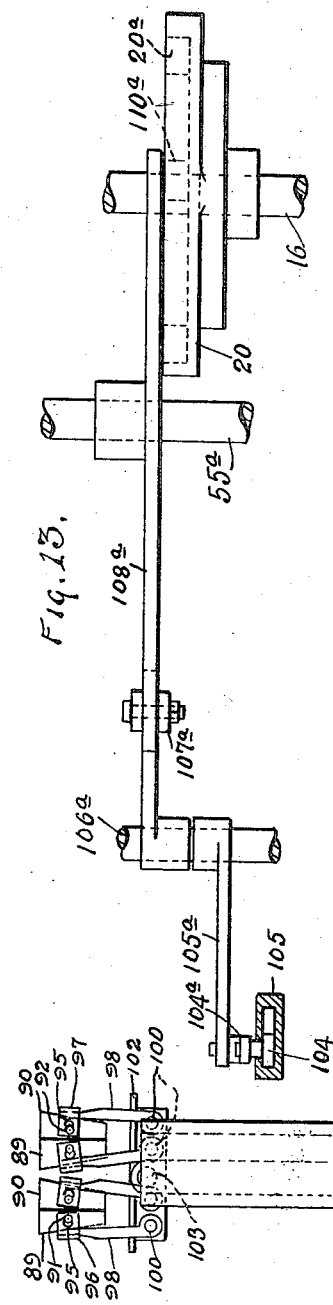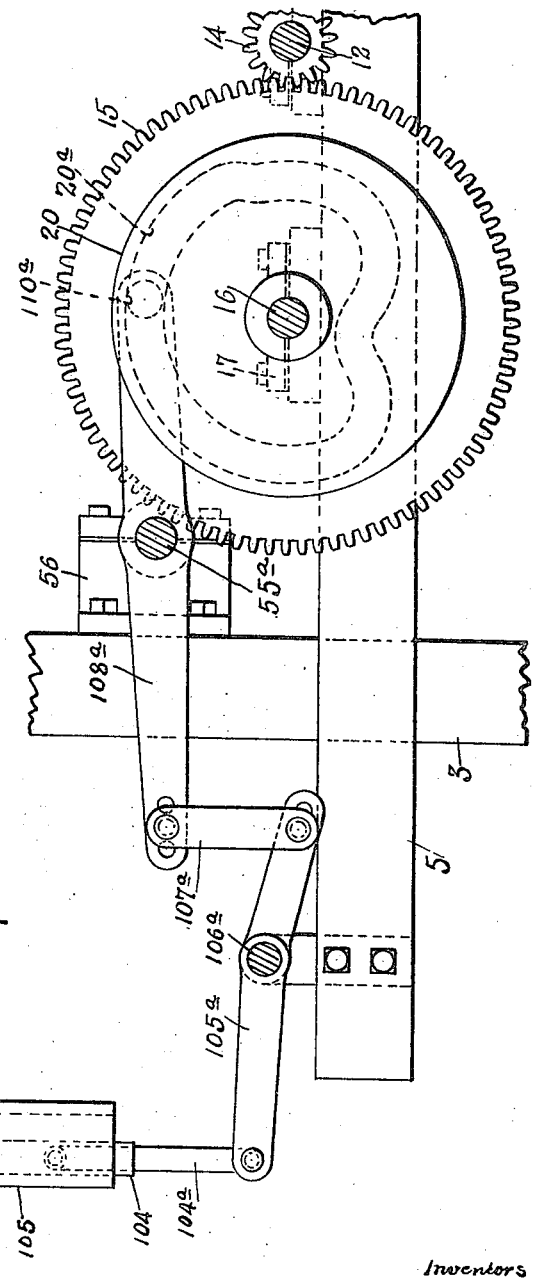

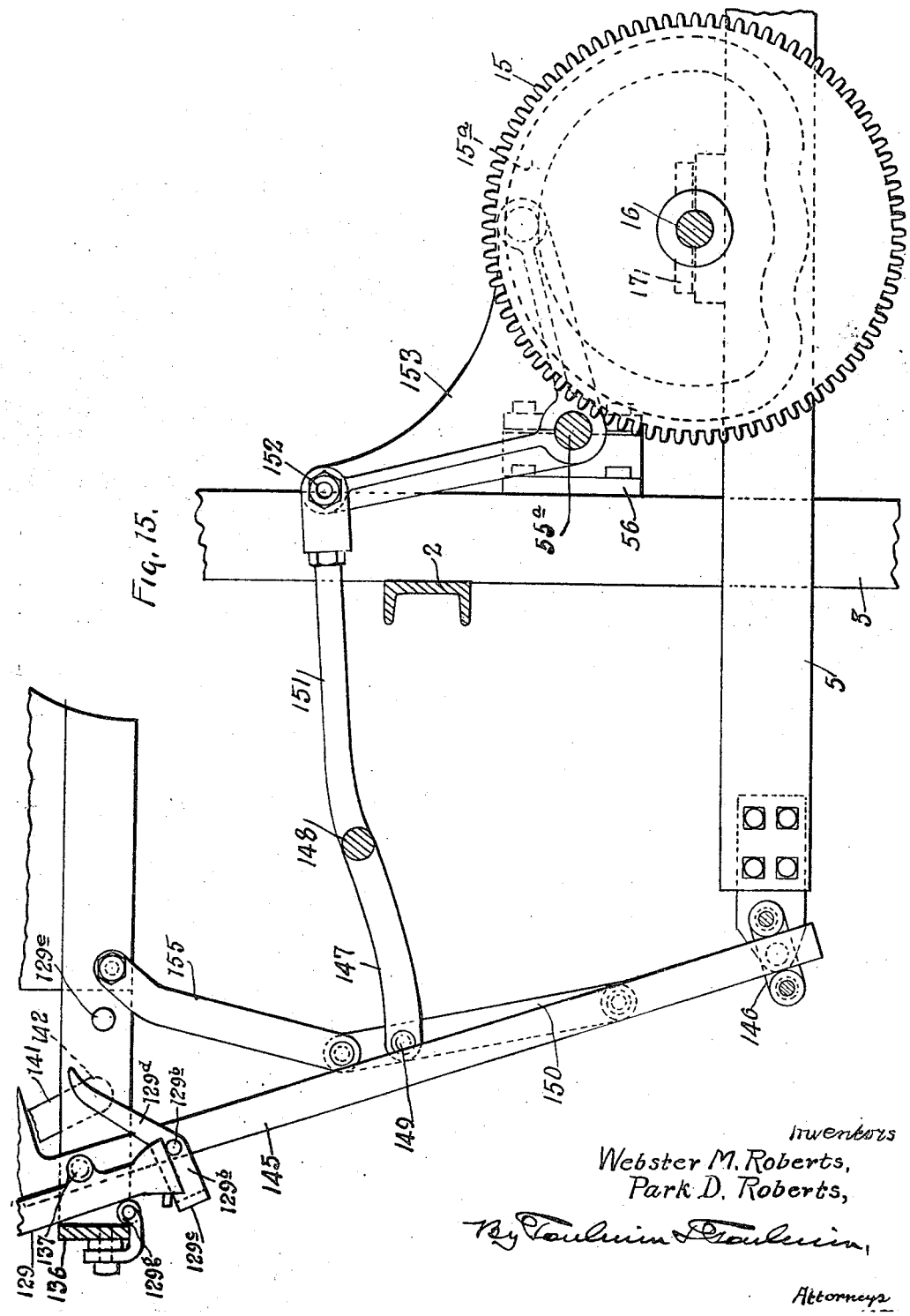

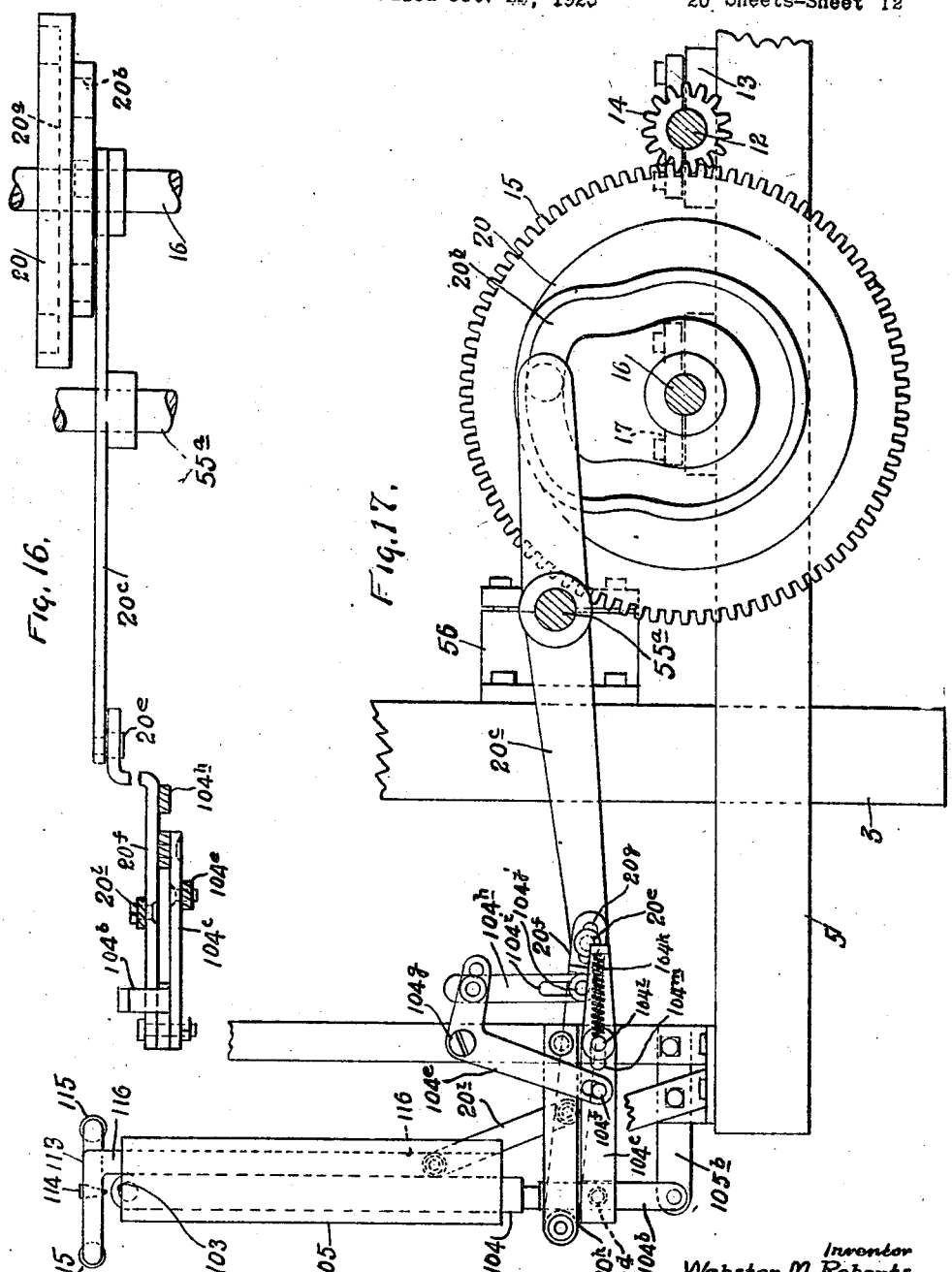

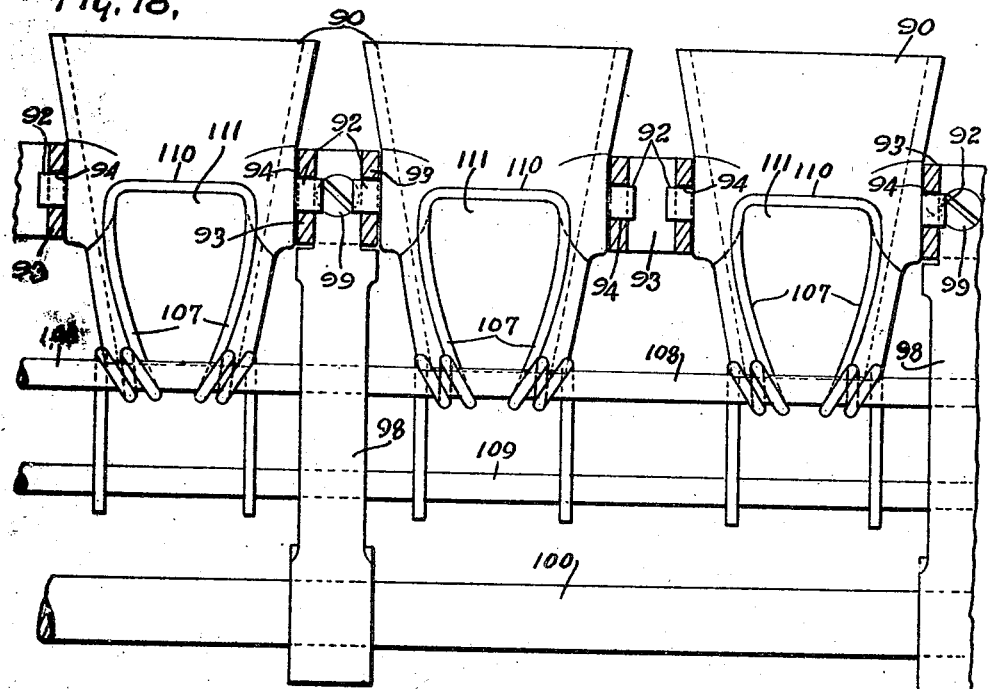
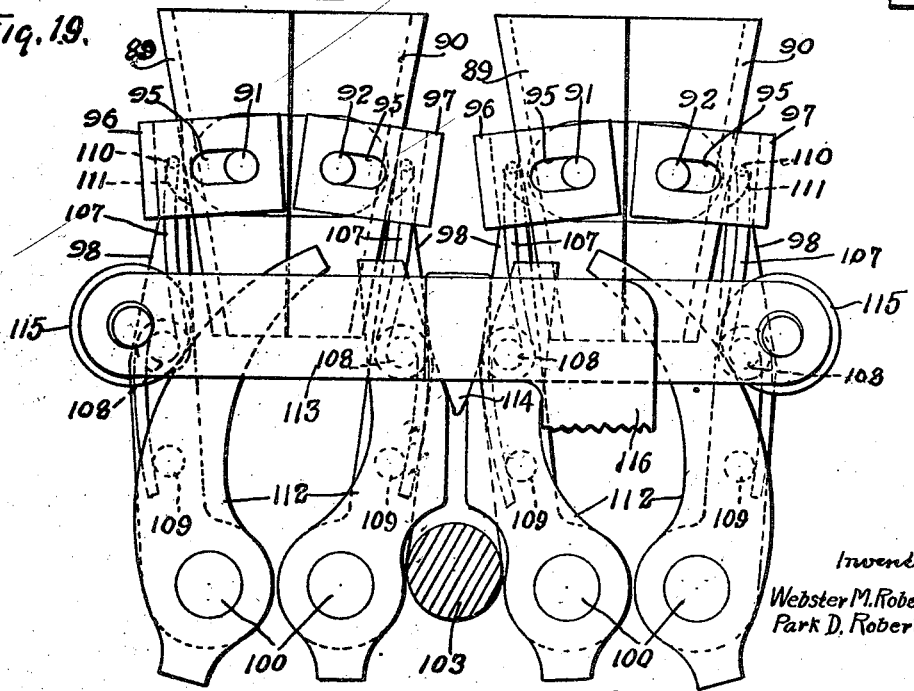

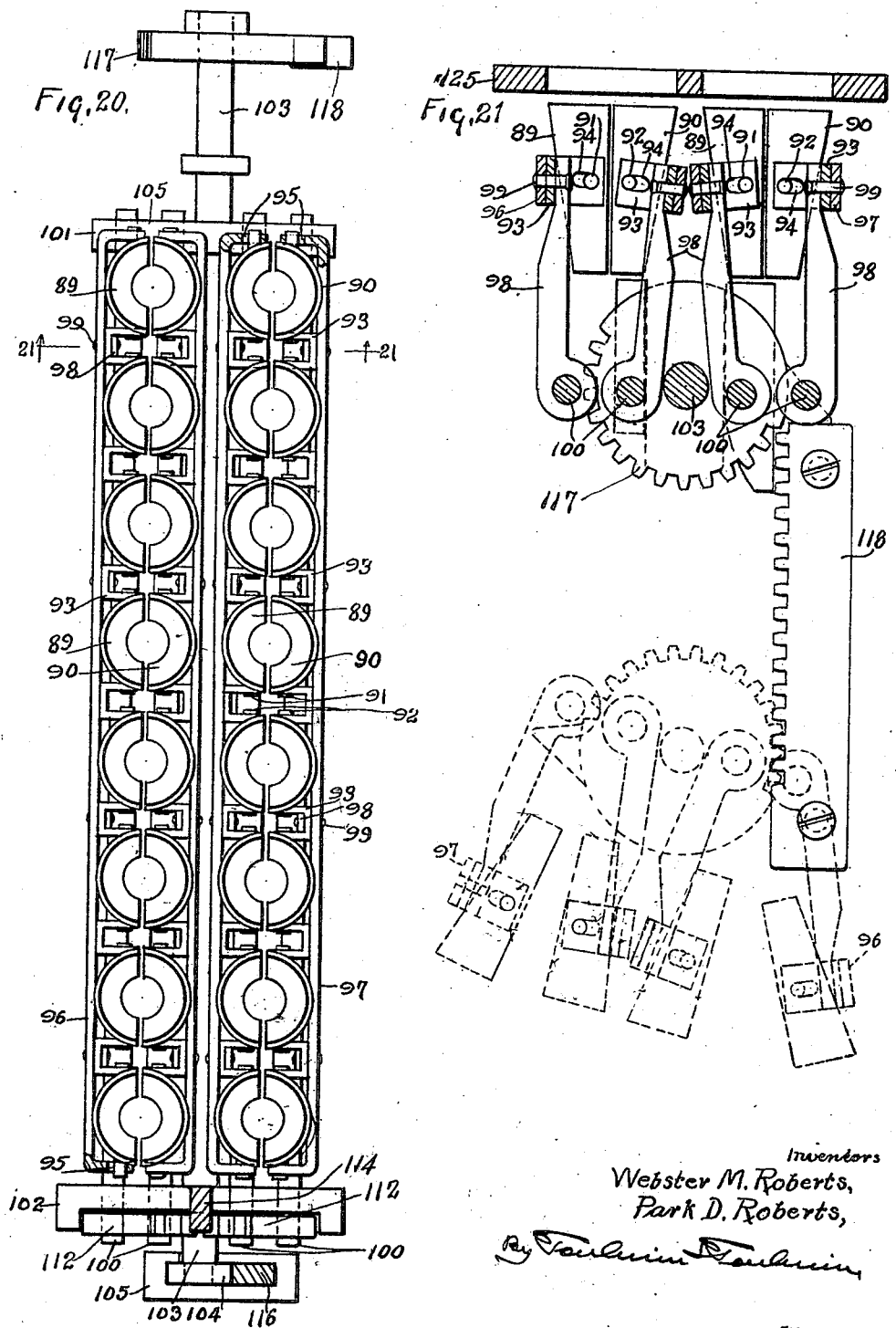

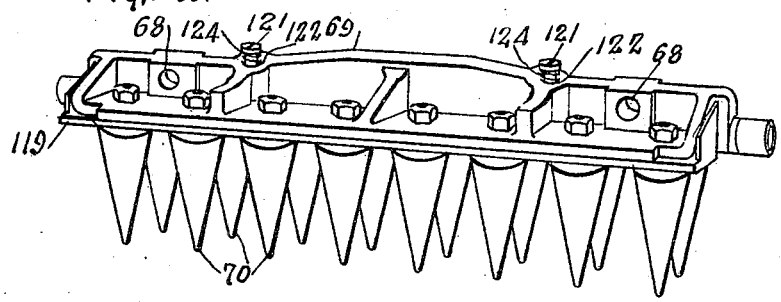
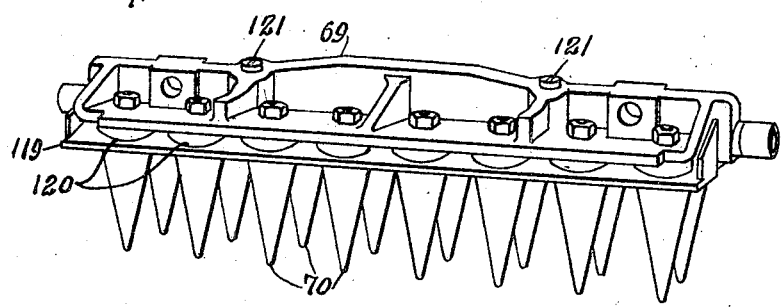
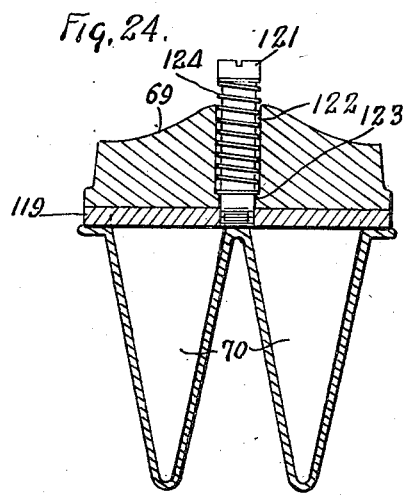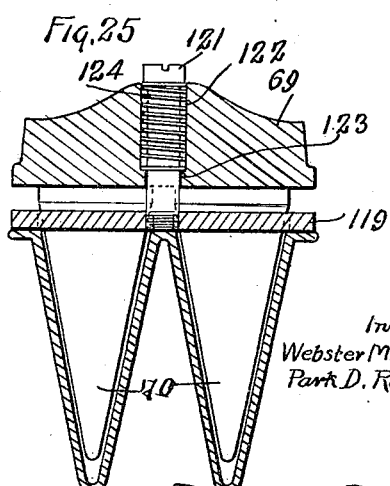

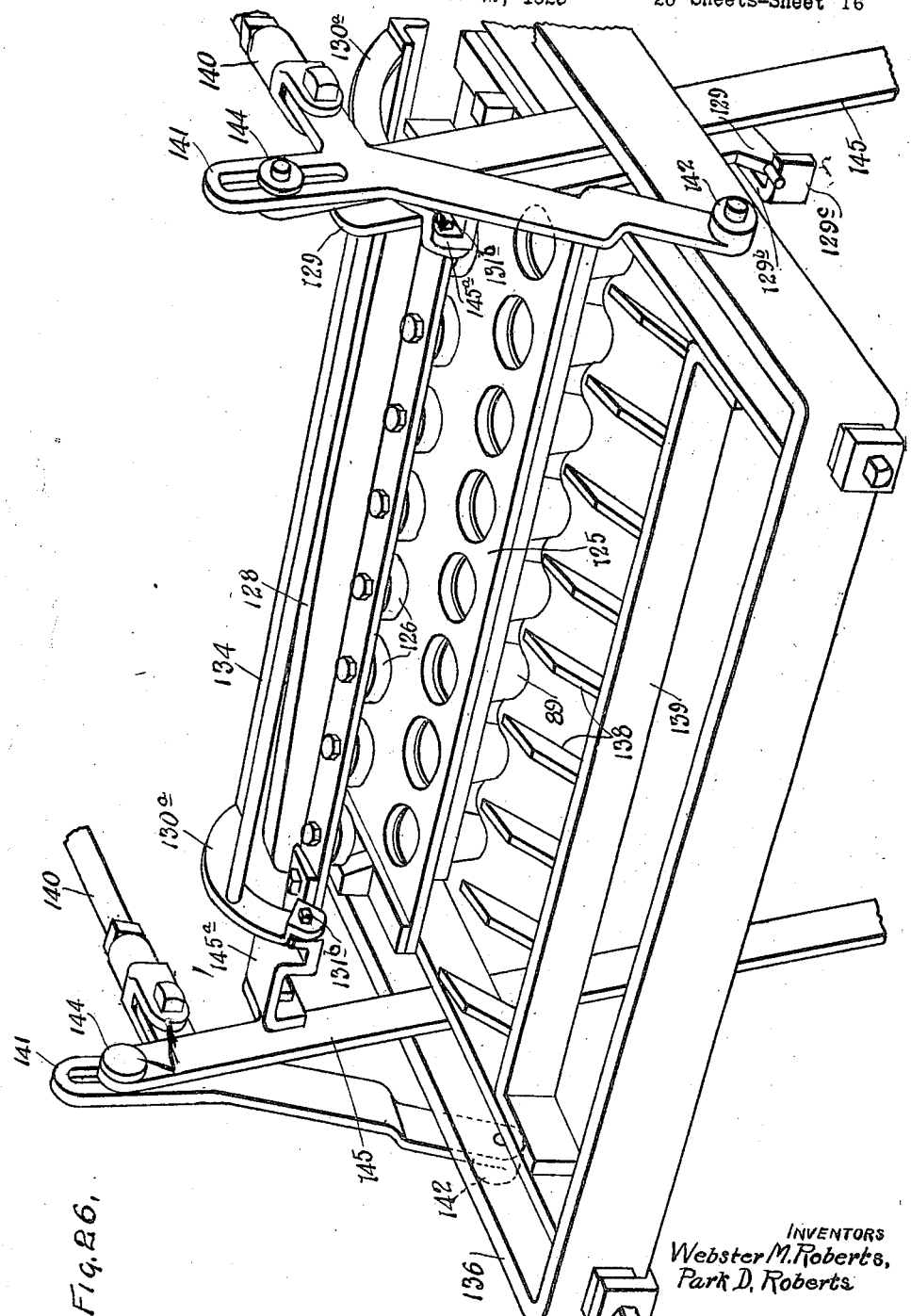

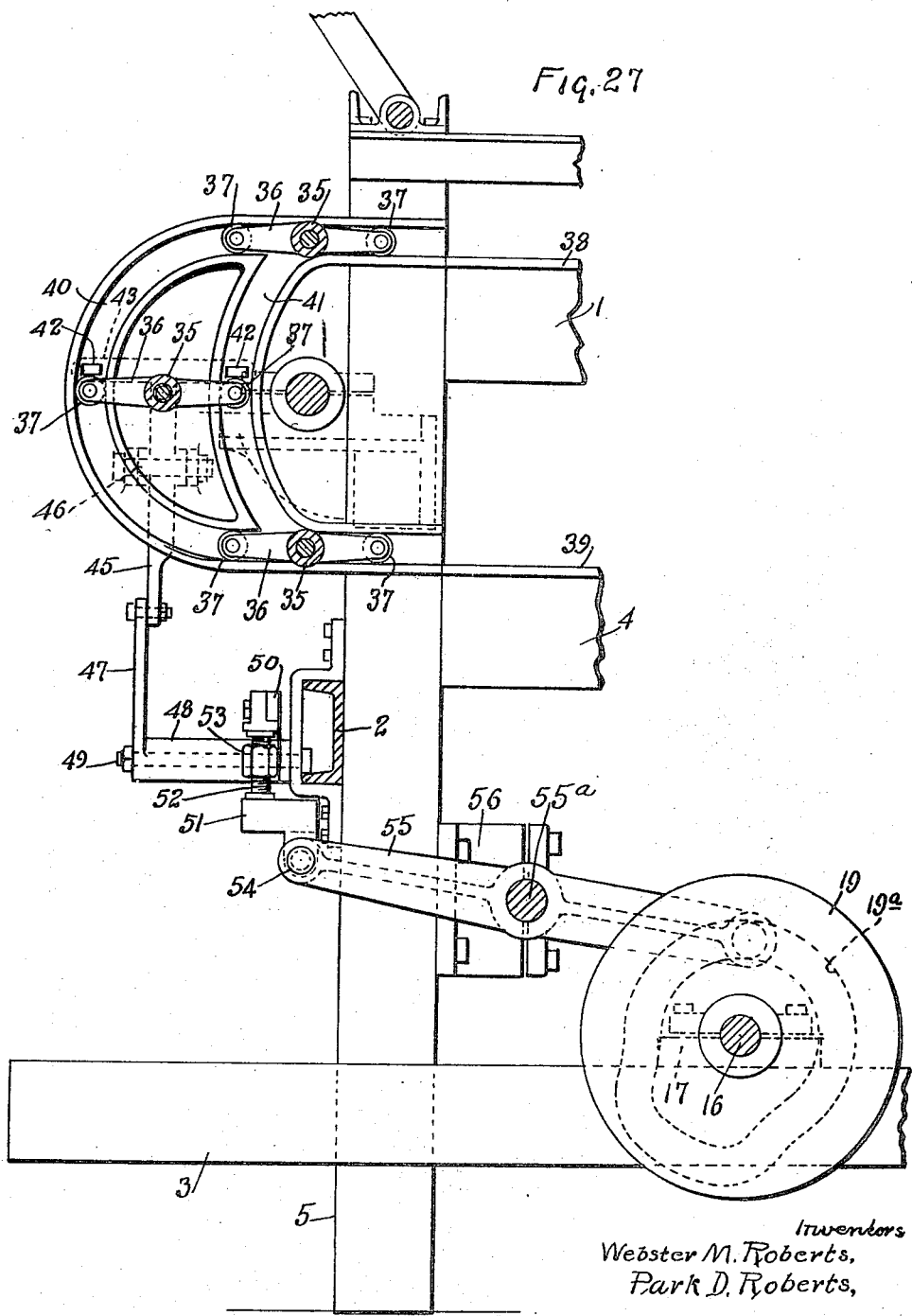

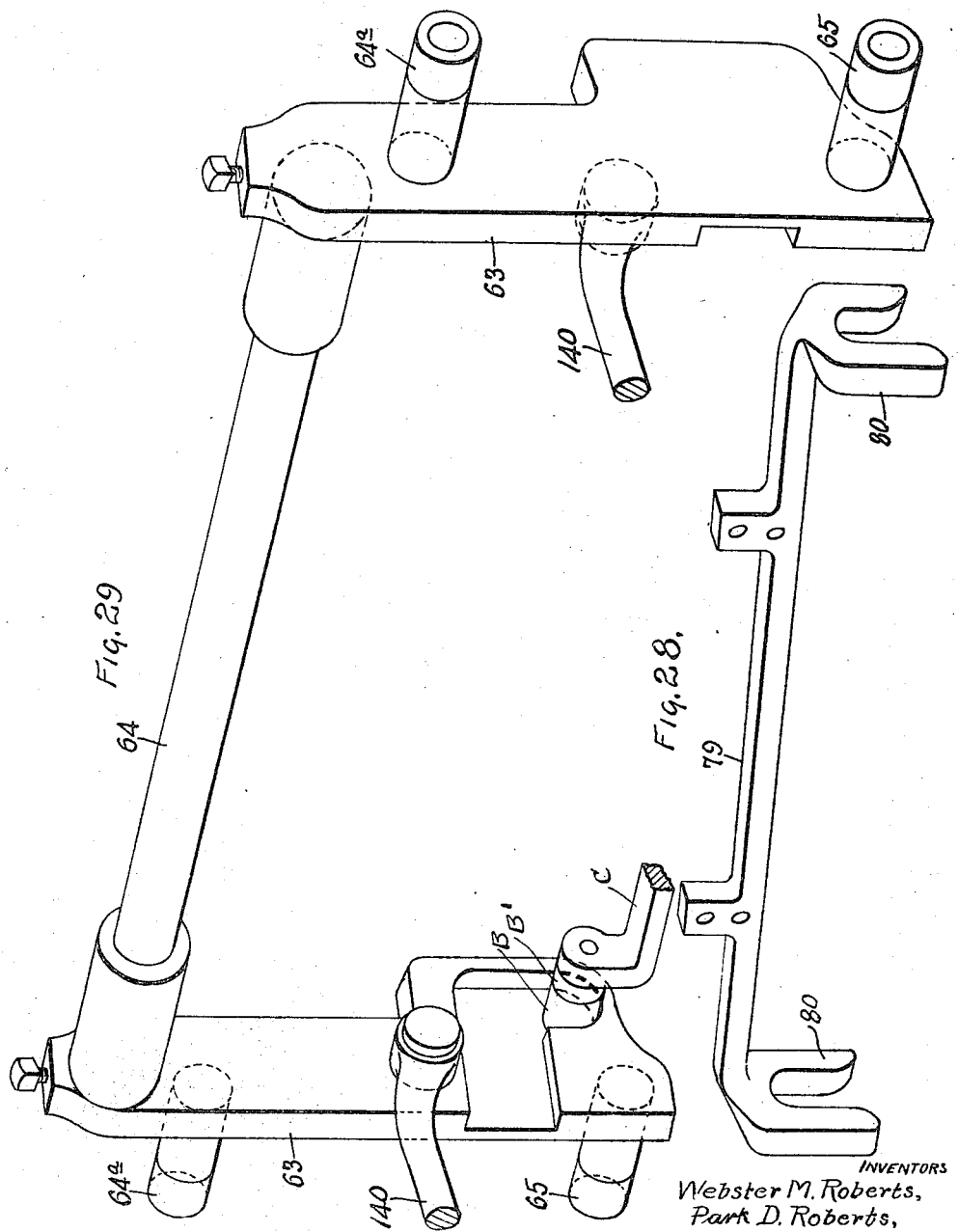

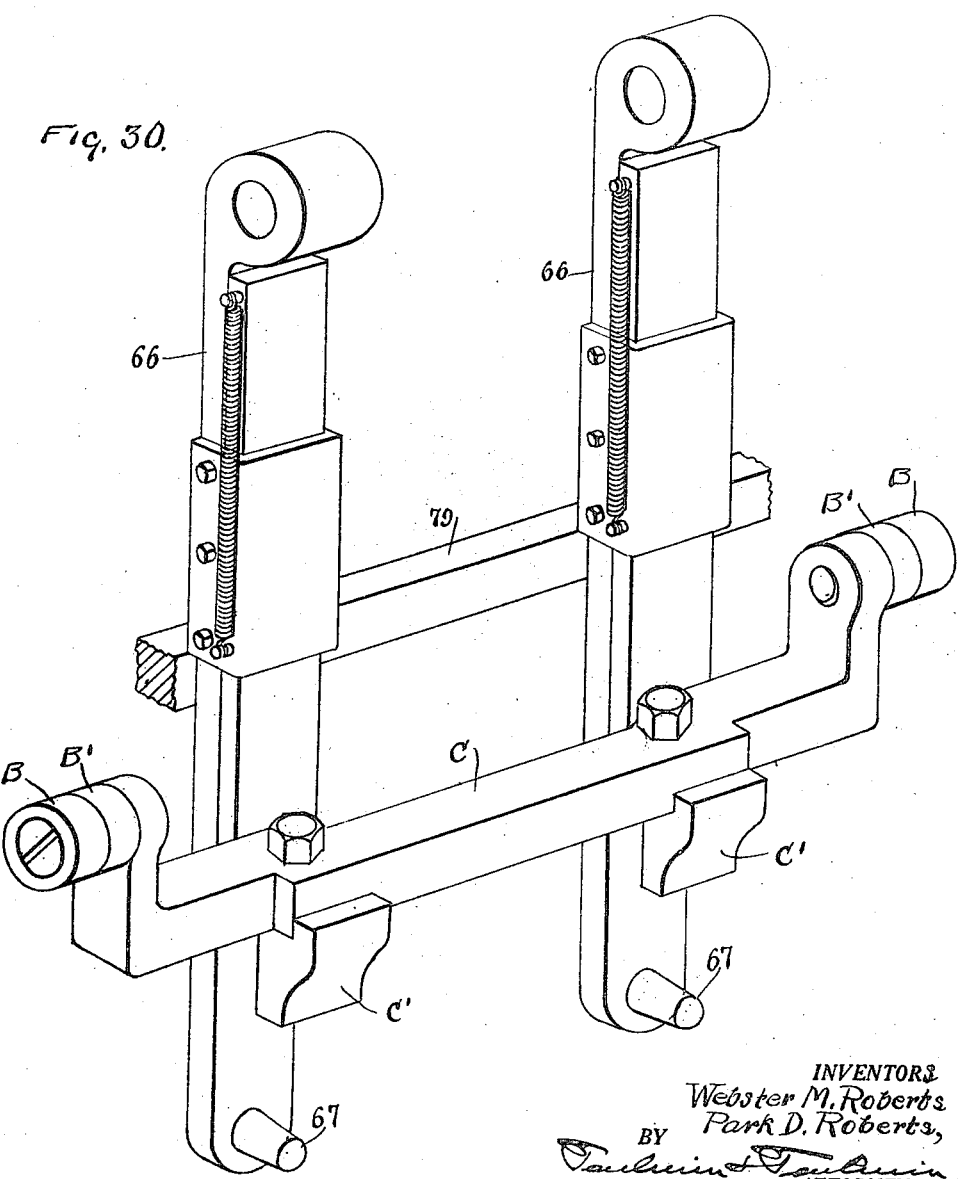

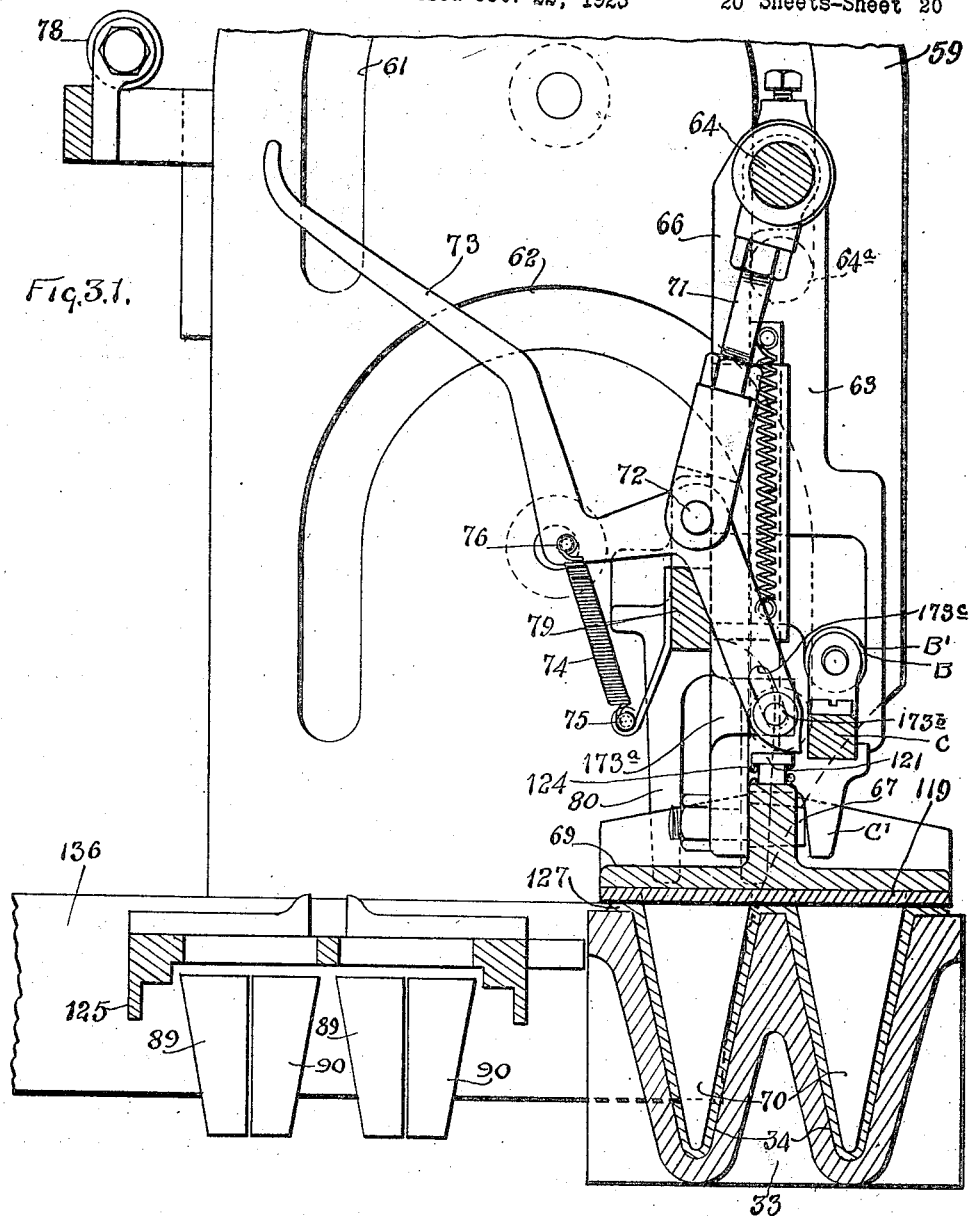

1,551,056

UNITED STATES PATENT OFFICE.

WEBSTER M. ROBERTS AND PARK D. ROBERTS, OF ST. JOSEPH, MISSOURI, ASSIGNORS TO ROBERTS CONE MANUFACTURING COMPANY, OF ST. JOSEPH, MISSOURI, A CORPORATION OF MISSOURI.

MACHINE FOR AUTOMATICALLY MAKING PASTRY CONES.

Application filed October 22, 1923. Serial No. 669,954.

*To all whom it may concern:*

Be it known that we, WEBSTER M. ROBERTS and PARK D. ROBERTS, citizens of the United States, residing at St. Joseph, in the county of Buchanan and State of Missouri, have invented certain new and useful Improvements in Machines for Automatically Making Pastry Cones, of which the following is a specification, reference being had therein to the accompanying drawing.

This invention relates to improvements in machines for automatically making pastry cones and constitutes an improvement in various features of refinement and arrangement over Letters Patent No. 1,423,259, issued to us July 18th, 1922, on machine for and method of making pastry cones.

In that patent the machine comprises an organization of non-openable or solid baking molds to receive the batter, forming cores operable to enter into the molds and remain during the baking operation, for forming the interior of the product, and to withdraw therefrom, taking with them the baked product and certain cone grippers adapted to receive the cores and the impaled cones, to engage the cones and hold them while the cores withdraw and then to discharge the cones.

In the present invention these cone grippers have been improved and are spring-opened and positively closed. The spring or self-opening feature of these grippers is a feature of prime importance in these new grippers.

A further feature of improvement has reference to effecting the discharge of the completed product or cone from the grippers which is done by a quick inversion of the grippers and an incidental or simultaneous opening of the gripper halves one from the other, so that the grippers invert and open and the cones quickly fall out and are gathered by suitable mechanism, such as an endless belt for transportation to the packing station.

In the present machine we combine with these grippers a device which we term a stripper whose office is to strip or loosen the cones from the cores when the cones are in the grippers and the cores are in the act of being withdrawn from the grippers and cones.

In the present invention a further feature is in coordinating with the trimmers, or devices employed to trim from the baked cones the projecting fins or fragments of baked batter, certain scrapers or devices to dislodge from the trimmers such fragments of the product as may adhere thereto after each trimming operation, so that the trimmers will always be clean and in condition to promptly execute their work of trimming.

Another feature of refinement in the present invention is in the mechanism for moving the carriage which lifts the cores from the molds to the grippers and from the grippers to the molds. In our patent referred to above there was one gear wheel and its attached lifting arm on each side of the machine, while in the present improvement there are two of these gears on each side, each having a lifting arm and both gears on one side meshing with a reciprocating rack bar, one for each pair of gears, whereby said carriage and the cores are more efficiently and with less strain and binding moved from each of their positions to the other, as will be explained in detail hereinafter.

Another feature is that of a presser or device to hold down on the stripper plate, when the cores are being lifted from the cones in the strippers, so as to cause such plate to maintain the cones in the grippers while the cores withdraw. This feature comprises, therefore, a combination of grippers, a stripper and a presser for acting on the stripper.

Still another feature of the present invention consists of a scraper which after the trimmer has been removed from trimming position will drag across the stripper plate and remove from it any fragments cut from the cones by the trimmers.

Yet another feature of our invention is that of the trimmer and this scraper being presented to and over the strippers by one movement, the trimmer removed by the advance return movement and the scraper later moved by the remainder of the return movement of the mechanism which operates and positions the trimmer and this scraper.

In addition to the foregoing special features there are others of an incidental but useful character, as will appear from the following specification.

In the accompanying drawings:—

Fig. 1 is a plan view of so much of an endless chain type of cone making machine as is necessary to illustrate in showing the application of the features of the present invention;

Fig. 2 is a similar view on a larger scale of the principal features shown in Fig. 1;

Fig. 3 is a side elevation of the essential mechanism illustrated in Fig. 2;

Fig. 4 is a partial side elevation and sectional view, on an enlarged scale, of the molds, cores, grippers, scrapers and mechanism for transferring the cores from the molds to the grippers and grippers to molds with adjunct devices;

Fig. 5ª is an enlarged detail showing the cam track and rollers which position the core bar latch;

Fig. 5 is an enlarged similar partial elevation and section showing much of the same mechanism on a larger scale;

Fig. 6 is a detail view, partly in elevation and partly in section, of the arm for positioning the trimmers and the scraper which acts on the stripper plate, and of the strippers and cones therein;

Fig. 6ª is a sectional view showing the cores and cones in the grippers and the stripper plate holding the cones down while the cores are about to start out of the cones;

Fig. 7 is an enlarged partial side elevation and sectional view of the mechanism for transferring the cores from the molds to the grippers and from the grippers to the molds, the trimmer scrapers, the trimmers, the grippers and the molds in their several positions just before the cones are to be removed, while the cones are being removed and after their removal, and of the operating mechanism used in these several connections;

Fig. 7ª is a detail edge view of the toggle and reciprocating bar shown in side view in Fig. 7;

Fig. 8 is an enlarged side elevation of the mechanism which operates the carriage by which the cores are transferred from molds to grippers and grippers to molds;

Fig. 9 is an elevation of the arch and lifter arms with which the carriage cooperates;

Fig. 10 is an elevation of the gear and gear cam and lever which actuate the rack and gears by which the carriage is operated in the arches in moving the cores from molds to grippers and grippers to molds;

Fig. 11 is a view of the mechanism by which the molds are secured or locked in position at the unloading station;

Fig. 12 is an enlarged side elevation of the same mechanism with a part of the general frame on which it is mounted;

Fig. 13 is a plan view of the mechanism for actuating the grippers;

Fig. 14 is a side elevation of the same mechanism and of the grippers, in full lines in normal position and in dotted lines in inverted or discharging position;

Fig. 15 is a side elevation, enlarged, of the mechanism which positions and operates the trimmers;

Fig. 16 is a plan view of the mechanism used to hold the grippers in position to receive the cones and cores;

Fig. 17 is an enlarged side elevation of the same mechanism together with adjunct devices;

Fig. 18 is an enlarged elevation of three of the grippers showing the devices by which they are spring-closed and by which they are supported;

Fig. 19 is an end view of what is shown in Fig. 18 with the addition of the cam horns by which the grippers are closed;

Fig. 20 is a plan view on an enlarged scale of the grippers and the frames in which they are mounted;

Fig. 21 is an enlarged partial elevation and section of the grippers in their normal or cone-receiving position and in their discharging position;

Fig. 22 is a detail perspective view of a core bar, its double series of cones and of the stripper plate for stripping the cones from the cores to leave the cones in the grippers when the cores withdraw from the cones;

Fig. 23 is a similar view of the same parts with the cores and core bar partially raised from the stripper plate, in which position of the parts the cones have been stripped from the cores by the action of the plate as the cores were lifted;

Fig. 24 is an enlarged cross section of the parts as shown in Fig. 22 with the cones added to the view;

Fig. 25 is a like view of the parts in the position shown in Fig. 23 with the cones now stripped from the cores by the action of the stripper plate and the elevation of the cores;

Fig. 26 is an enlarged perspective view of the stripper plate, the trimmers and the trimmer strippers, showing the trimmers just above the plate but approaching it to perform the trimmer operation which the trimmers are in the act of doing as shown in Fig. 6;

Fig. 27 is an enlarged side elevation, with some of the parts in section, of one end of the main frame, the mechanism which operates the stops by which the arms on the molds are positioned in holding the molds in discharged position when they reach and rest momentarily at the discharge station;

Fig. 28 is a perspective view, in detail, of a certain yoke which is attached to the core lifters;

Fig. 29 is a perspective view, on an enlarged scale, of a portion of the carriage by which the cores are moved from the molds to the grippers and from the grippers to the molds;

Fig. 30 is an enlarged detail perspective view of the core swinging frame with the rollers and latch shown in Figs. 5 and 5ª.

Fig. 31 is a detail view in section showing the core-bar and the lifting mechanism for transferring it from the molds to the grippers.

The numeral 1 designates the longitudinal members of a general frame which is connected by cross members 2. These horizontal members are supported by uprights 3 while other horizontal members 4 and 5 enter into the construction of the general frame. In the drawings we have illustrated what may be called the forward portion of the machine, being that end of the machine where the driving mechanism is preferably located and where the molds are unloaded of the finished product and the grippers and trimming devices are placed.

This driving mechanism, in the form and arrangement we prefer, comprises a belt pulley 6 adapted to be driven by a power belt 7 and mounted on a shaft 8 having bearings 9 on the main frame. A pinion 10 on this shaft meshes with a gear wheel 11 on a shaft 12 which also is mounted in bearings 13 supported by the frame. The shaft 12 has a pinion 14 which meshes with a large gear wheel 15 carried by the shaft 16 having bearings 17 on the frame.

On this shaft 16 are carried and by it are operated the several cams, the cam 18 for operating the batter mechanism, the cam 19 having a track 19ª which operates the mechanism for positioning the mold stops and a track 19ᵇ which operates the mechanism for actuating the mold locks; the double cam having a track 15ª in the gear 15 which actuates the mechanism for operating the trimmer and a cam track 15ᵇ which actuates the mechanism for transferring the cores from the molds to the grippers and from the grippers to the molds; the double cam 20, one portion of which 20ª operates the slide for the grippers and the other portion, 20ᵇ, operates the mechanism for closing the grippers.

This shaft 16 which may be termed a major driving shaft since all of the motions are distributed by it to the different mechanisms which actuate, respectively, the several devices which produce the product, carries also a sprocket pinion 21 by which is driven a sprocket chain 22 which is tightened or loosened by a belt tighter 22ª and which rides upon and drives a sprocket wheel 23 mounted on a stud shaft 24 supported in a block 25 secured to the main frame. This stud shaft further carries an actuating head 26 having diametrical arms 27 each provided with a roller 28 adapted to enter slots 29 in a disk 30 to intermittently rotate the disk. This head with its arms and this disk with its slots therefor constitute an intermittent chain operator. One loop of the chain is shown at 31 where it passes over sprocket wheels indicated at 32, particularly in Fig. 3, the other loop of the chain being supported similarly at the rear end of the machine, not illustrated because not forming a part of the present invention. This chain is also suitably supported at intervals so that it and the mold sections, to be presently described, will readily travel through the entire machine from end to end, during which travel the batter is baked in the space between the mold cavities and the cores, by means of any approved baking devices, such as burners supplied with gas—features not pertinent to the present improvements.

As the arms 26 engage the disk 30 at intervals it will be understood that the rotation of the disk and therefore of the sprocket wheels and chains is intermittent, short intervals of rest between the steps of rotation being caused by the time which lapses between the time the roller 28 of one arm leaves the slot 29 and the roller 28 of the other arm enters another slot 29. This interval of inaction gives time for the removal of the baked cone from the molds, an operation to be more fully described when specific reference is made to the method of unloading the baked cones from the molds.

Referring now to the molds they are indicated at 33 and comprise a body of metal fashioned with a series of cavities 34 preferably of conical form, two series of such cavities being in each body, eight in number so as to make a group of sixteen cavities in each mold unit. Of course, some other number may prevail but in the present instance there are sixteen cavities per mold unit. These molds are solid in the sense that they are not separable and therefore do not open and close as is done in another type and class of pastry cone molds. At their ends they have projecting trunnions 35 which carry arms 36 one at each end. These arms have rollers 37 adapted to travel upon the tracks 38 and 39 formed on or connected to the horizontal members 1 and 4 of the main frame. These rollers travel in track grooves 40 and 41 which constitute a continuation of the tracks 38 and 39 at the forward end of the machine. See Fig. 27 particularly. The forward roller on each arm 36 enters the track groove 40 and the roller on the rear end is adapted, (through a peculiarity not pertinent to the present improvements) to enter the groove 41, so that as the sprocket wheels rotate the chains and a mold reaches this part of the machine, these arms with their rollers travel from the lower to the middle position shown in Fig. 27. There the rollers contact with stops 42 which project into the grooves from a bar 43. This stopping of the mold unit takes place when one of the rollers 28 on the arms 26 leaves a slot 29 in the disk 30. This is when each mold reaches the unloading station which is that shown in the middle group of molds in Fig. 7.

The stops 42 are timed to take their position in the path of the rollers 37 at the proper time. They are actuated by a lever 45 attached to the bar 43 and pivoted at 46 and connected to an oscillating arm 47 on a rocking sleeve 48 mounted on a bolt shaft 49, and having another arm 50 projecting therefrom so that when it is actuated up and down it will rock the sleeve and thus operate the lever 45 and its attached parts. The arm 50 is attached to a clip 51 through an adjustable connection in the nature of a bolt 52 operable by an angular boss or nut 53. The clip 51 is pivoted by a connection 54 to the lever 55 whose shaft 55$^a$ is mounted in a bearing 56 on the main frame and operated by a cam 19 whose cam groove 19$^a$ is contoured to cause the stops 42, through the intermediate parts described, to be positioned at the proper time to stop and release the mold units as they arrive at and depart from the discharging station. This cam 19 gets its motion from the shaft 16 as before described.

It will now be seen that the mold units, with a group of cores in each unit and the baked cones in the cavities and on the cores (after the batter filling and baking steps have taken place) will arrive in succession at the discharging station where each mold unit and its cores will stop long enough to permit of the withdrawal of the cores with the cones adhering thereto; and for the cores to be carried over to the grippers, to the left in Fig. 7, and with the impaled cones inserted into the grippers, and then for the cores to be withdrawn from the cones and transferred back and be reinserted in the then empty cavities. At that time the mechanism advances the chain another step, the empty mold just described moves on and a filled mold succeeds it, arrives at the discharge station, is stopped and discharged in the manner just stated, thence to be later moved on with its returned inserted cores.

We will now refer to the mechanism by which the cores are removed from the molds while at the discharging position, carried over to and inserted in the grippers, withdrawn from the grippers and returned to the mold cavities. This mechanism consists of two arches 59, one at either side of the machine near the front end, each arch being suitably secured to the general frame, including a brace connection 60, as seen in Figs. 1, 2 and 7. Each arch has two curved ways 61 and 62 in which a certain carriage travels from a position substantially over the molds when in their discharging position to a position over the grippers. At the time the cores with the impaled cones are to be lifted from the molds and transferred to the grippers the carriage will be found in the position shown best in Fig. 5 and when the cores and cones are being inserted in the grippers the carriage will be found positioned over the grippers, as best shown in Fig. 4.

This carriage consists of two plates 63, one for each arch, connected by a cross shaft 64 at the top and having guide studs 64$^a$ and 65, the former adapted to slide in the way 61 and the latter in the way 62. On the shaft 64 are hung two core lifters, one at each side, indicated at 66 and having at their lower ends lifting pins 67 adapted to enter each a hole 68 in the core bar 69 so that when the carriage is manipulated it will carry the core bars and their connected cores 70. The stripper plate carried by the core unit we shall refer to later.

Also hung from the shaft 64 are two links 71 to whose lower ends are pivoted at 72, one at each side, presser levers 73 whose function is to press down upon the stripper plates. A spring 74 anchored at 75 is connected at 76 to the presser lever 73 and tends to draw downward on 73 and causes the foot 77 of 73 to move upward, this action of the spring 74 being permitted when the upper end of the presser lever 73 passes out of contact with the roller 78 supported one by each of the arches 59. When 73 comes in contact with roller 78, as shown in Fig. 4, it causes the foot 77 to press downward on the stripper plate pin 121.

A yoke 79 is attached to the core lifters 66 and has prongs 80 which fit over a stud 81 on each of the mold lock bars 82. These jaws pass over these studs when the carriage lets the cores down into the molds. It will be noticed that when the carriage lets the cores down into the molds, the rollers B and B′ come in contact with the cam track A, Figs. 5 and 5$^a$, which raises the latch C, on the bar C′ so that pins 67 can be withdrawn. The cam track A is shaped so that the latch C is held open during the swinging movement of the core bar lifters 66. Then when the lock bars 82 are operated to release the molds the studs 81 acting on the prongs 80 will swing the core lifters 66 so as to withdraw the lifting pins 67 from the holes 68 in the core bar. These things are seen generally in Figs. 4 and 7 and in detail in the perspective Figs. 28 and 29.

We will now refer to the mechanism by which the core lifting carriage is actuated from one position to the other in the ways 61 and 62. This is done by gears 83 and 84 mounted in the arches 59. Each pair of these gears is operated by a rack bar 85, one at either side of the machine, such bars being mounted to slide up and down in suitable ways attached to the frame, as indicated at 86 and 87, so that when the rack bars are actuated they will partially rotate these gear wheels. These gear wheels carry bifurcated arms 88 which embrace the studs 64ª and 65 of the respective plates 63 of the core lifting carriage.

Therefore, when these gears are partially rotated they move this carriage from over the molds, as in Fig. 5, through the ways 61 and 62 over to a position above the grippers. The carriage as before described takes a core bar with its series of cores and cones from the molds in making this travel to the grippers.

A down stroke of the rack 85 accomplishes this movement. An up stroke of the rack reverses the movement and moves the carriage from over the grippers on through the ways 61 and 62 to a point over the molds and in doing so carries the cores back to the molds after they have been stripped of the cones. The cones, of course, went with the cores from the molds into the grippers.

Referring now to the grippers they consist each of two halves 89 and 90 divided on an axial line and tapered on their periphery so as to form within them a tapering cavity corresponding in shape and essentially in size with the cavities in the molds. Each gripper section has a stud pin 91 and 92, respectively. All of these pins extend through yokes 93 which are slotted, as shown at 94, except the outer pins of the end grippers which extend through slots 95 in the ends of frames 96 and 97. To support these frames and consequently the grippers we extend within them supporting fingers 98 and rivet them to the yokes and frames, as indicated at 99 in Fig. 20. These supporting fingers are themselves supported each upon a shaft 100. These several shafts extend through plates 101 and 102 and are sustained by a heavier cross shaft 103 which itself is sustained in slides 104, one near either side of the machine, mounted in guides 105 which are stationary and suitably fixed to the main frame, as by braces 106 shown in Fig. 7.

In order to cause the gripper halves to spread apart we provide springs 107 which, as seen in Figs. 18 and 19, are coiled about a shaft 108 with their lower ends against a stop rod 109 and their upper ends, in the form of loops 110 fitted within lugs 111, the lugs being projected from the gripper halves. The tendency of these springs is to spread the gripper halves apart so that they constitute gripper openings which will quickly spread the gripper halves when they are released.

To control these springs and hold the mold halves together, as also to bring them together when they have been spread by the springs we provide cam arms or horns 112 mounted on the shafts 100 which also carry the supporting fingers 98 as before stated. It is obvious that by rocking these shafts through these cam horns in a direction opposite to the tension of the springs that the springs will be overcome and the gripper halves brought together by the supporting fingers 98. To give these horns such a movement we use a transverse bar 113 to which we attach a central wedge 114 to act on the two inner horns 112 to cause them to rock their shafts 100 and on which bar we mount rollers 115 which likewise act on the two outer horns 112 and rock them in the opposite direction. Thus the two horns for each line of mold halves are caused to rock their shafts 100 and swing the supporting fingers 98 toward each other to overcome the tension of the springs 107 and cause the yokes 93 to force the gripper halves together, as will be seen by examining Figs. 19 and 20.

The actuating bar 113 is itself operated by an upright 116 which is connected to the bar 113 and operated up and down by the means hereinafter described and which means may be of any acceptable type.

It will now be understood that the grippers are automatically opened and closed—nearly closed when the cores with their impaled cones enter the grippers immediately after which the gripper halves fully close to grip and hold the cones while the cores are being withdrawn and severing their adherence to the cones due to their more or less sticky nature resulting from their sugar content. And as will be explained later the device known as the stripper plate holds the cones in the grippers while the cores make their first movement in the act of withdrawal, so that the cones will be detained as the cores break their adherence to them.

But before proceeding to detail description of the stripping operation we will refer to the manner in which the grippers are caused to discharge the cones after the withdrawal of the cores and after the trimming operation by which the fins of batter are removed from the large ends of the cones.

It may be assumed that these two intermediate steps have been performed and that the cones are now to be discharged from the grippers. The first step is to lower the grippers by drawing the slide 104 downward in the guide 105. This has the effect of withdrawing the horns 112 from their contact with the wedge 114 and rollers 115 which results in the springs being freed when they flip the gripper halves apart and let the cones drop upon such form of conveyor or into such receptacle as convenience may dictate. This withdrawal of the horns from such contact is occasioned by the downward movement of the sliding shaft 103 in the guide 105. In doing this the grippers not only open but become inverted by swinging from an upright into an inverted position. This is done through the action of the gear wheel 117 on the shaft 103 meshing with a stationary rack 118 suitably supported from the frame 2. As the shaft descends the gear rolls in the rack and inverts the supporting fingers 98 and the grippers by turning over the shaft 103 and through it the plates 101 and 102 in which the shafts 100 are mounted.

The release of the gripper halves so that they will open and the inversion of grippers make the discharge of the cones from the grippers very perfect and quick and deliver the cones with their larger ends downward.

The return or reverting movement of the grippers is effected by the reverse rolling of the gear 117 in the rack 118 as the parts are returned to their upper position through the action of the mechanism which gives these up and down movements to the shaft 103. When the grippers have passed above the bar 113 the horns 112 will be quickly acted upon by the rollers 115 and wedge 114 and the gripper thereby again quickly closed.

The cam mechanism by which the bar 113 is actuated has provision, as will appear in detail hereinafter, whereby the gripper halves stand slightly apart at the time the cones and cores enter them, but closed tightly, by a slight downward movement of the bar 113 when the cones and cores shall have fully entered into the grippers, so that the grippers will snugly hold the cones, though without crushing or breaking them, when the cores are withdrawing.

At this point in the operation the stripper plate 119 comes into use. See Figs. 22, 23, 24 and 25 for a clear view of the stripper. It consists of a plate having openings, as indicated at 120 in Fig. 23, which fit over the cores. The plate is connected to the core bar 69 by means of bolts or pins 121 which are slidable in an opening 122 in the bar which is shouldered at 123 to support a coiled expansion spring 124, whose upper end presses against the shoulder formed by the head on the screw. The normal tendency is to keep the plate clamped against the core bar 69 as shown in Fig. 22. By pressing downward on the screw heads 121 the stripper plate is held down on the cones to keep them in the grippers as the cores break contact or connection with the cones. With the stripper plate so held the core is raised, pressing the springs 124 as it does so until the heads of the bolts 121 reach the bar, by which time the cones are entirely separated from the cores and the core bar then lifts the stripper plate which quickly snaps against the bar by the action of the springs.

We have before referred to the presser lever 73 whose function is to press down on these bolts 121 and hold the stripper plates over the cones while the cores start out, as just described.

We have also referred to the core bar lifter 66 whose pins 67 enter the holes 68 in the core bar so as to lift the cores. These features coact with the core bar and the stripper plate in the operation of the withdrawal of the cores and the temporary depression of the stripper plate described above.

We will now refer to the trimmers by which the fins or rough edges on the upper ends of the cones, due to the batter having gathered on the upper surface of the molds, are cut off, while the cones are in the grippers and after the cores and stripper plate have been removed and are making their return to the waiting empty mold at the unloading station, from which the cores and plate came when delivering a group of cones into the grippers.

These trimmers consist of a die plate 125 which is stationary, being fastened to the main frame in any convenient manner and which extends across the machine and is located immediately over the grippers when they are in their upper position. This die plate has a series of openings in it corresponding to the position and substantially to the size of the upper ends of the cavities formed by the grippers. The gripper further consists of a series of punches 126, one for each opening, each adapted to come down on the cone fins, indicated at 127 in Fig. 6, and sever the same from the remainder of the cone. These dies are circular and enter the openings in the die plate and encircle the upper ends of the cones while in their cutting action, as also indicated in Fig. 6.

The punches are secured to a trimmer bar 128 which extends substantially across the machine so as to carry as many punches as there are openings in the die. This bar 128 is secured to travelling bars 145 through brackets 145$^a$. Arched bars 130$^a$ are pivoted at 130$^b$ to the brackets 145$^a$, as shown in Figs. 6, 6$^a$ and 26. A scraper bar 134 is secured to the arch bars 130$^a$. One of these arched bars is secured to a support 129 by means of an arm 130. Therefore, when the supports 129 are operated from the position shown in Fig. 7 to that shown in Fig. 6 the punches will be presented to the dies. The supports 129 being pivoted to an extension 136 on the main frame at the point 137 when the swinging movement is imparted to them it and the arm 130 will cause the scraper 134 to be properly positioned for scraping purposes, as shown in Fig. 6, where it is about to scrape off the fins of baked batter that are on the die plate 125, having been left there after the operation of the trimmer. The connections are such that when the supporting arm 129 starts to swing from the position shown in Fig. 6 to that shown in Fig. 7 the punches are lifted a short distance, above the die 125, before the scraper 134 begins to drag across the die (Fig. 6$^a$) for the removal of the material. Then later in the movement the scraper is lifted away together with the punch from the die, as seen in Fig. 7.

As it is found that fragments of the baked material are apt to stick to the punches 126 we provide a scraper composed of a series of blades 138, see Figs. 7 and 26. These blades are secured to the cross bar 139 which is fastened to the extension 136 from the main frame. The blades stand in position to cause the punch bar 128 to drag across them while they enter between the punches and dislodge any material that may have adhered. This keeps the punches clean so that they will readily enter the dies and do their work.

We will now describe the mechanism for presenting the punches and the scraper 134 to and from the grippers to perform the trimming and scraping operations. Two movements are required for this purpose. One is a lateral movement from left to right and right to left, as viewed in Fig. 7. The other is a vertical movement sufficient to bring the punches and this scraper from the higher position they occupy in Fig. 7 to the lower position they occupy in Fig. 6. Therefore, the devices now to be described give these punches and this scraper these two movements—lateral and vertical.

The lateral movement is performed by the links 140 connected to the carriage which transfers the cores from the molds to the grippers and from the grippers to the molds and also connected to oscillating bars 141 pivoted at 142 to the extension 136 and slotted at their upper ends, as shown at 143. Pins 144 carried by travelling bars 145 reciprocate in the slots 143 when the links 140 travel laterally and swing these several parts.

The travelling bars 145 at their lower ends are guided by clips 146 so that when they swing laterally at their upper portions they can slide longitudinally and compensate for this movement. To give these bars 145 a sufficient longitudinal movement so that they will act to lower the punches and scraper 134 to the proper level with respect to the dies, we provide a toggle connection shown in Figs. 7 and 7$^a$ which acts to reciprocate each bar 145. This toggle is operated by the following devices—the yoke comprised of side arms 147 and a cross rod 148. See Figs. 1, 7 and 15. The side arms 147 pivot at 149 to one of the toggle members 150. Therefore, when the yoke is reciprocated the toggle will be bent or straightened and the sliding bar 145 will be lowered to bring the punches and scraper 134 down to the die of the trimmer and elevated to position these parts in their higher plane of temporary rest shown in Fig. 7. To so actuate the yoke we provide a pitman 151 connected at 152 to a bell crank lever 153 mounted on the shaft 24 and actuated by a cam 15$^a$ formed in the side of the gear wheel 15. These parts are best shown in Fig. 15. This cam receives its rotary motion when the gear 15 is driven by the pinion 14. In constructing a machine embodying the mechanism now being described the constructor will get the results stated by substantially following the cam contour shown in Fig. 15.

As the supporting device to sustain the punches and the scraper 134 the support 129 must at times be held rigidly, while at other times, as with the parts in the position shown in Fig. 6, it must have freedom of movement on its pivot 137. To effect these objects we pivot at 129$^a$ a detent 129$^b$ having a lug 129$^c$ adapted to hold the support 129 in this rigid position, and having an arm 129$^d$ which rides on a stud 129$^e$ projecting from the main frame, as shown in Figs. 4 and 15. A contracting spring 129$^f$ holds the detent arm against this stop and also keeps the lug 129$^c$ in position against the support 129. This might be called the normal state of things. When, however, the toggle moves the sliding bar 145 downward the arm 129$^d$ slips off of the stop 129$^e$, permitting the detent to become free enough to permit the support 129$^a$ to turn on its pivot 137 so as to let the punches and scraper 134 down to working position shown in Fig. 6. A guide roller 129$^g$ cooperates with the support 129 during its movements.

A member 155 shown more particularly in Figs. 3 to 7 and 15 connects at its upper end to a part of the main frame and at its lower end to the upper part of one of the toggle members.

Referring now to the mechanism by which the core lifting carriage mechanism is actuated the numeral 85$^a$ designates an arm which connects with the lower end of the rack 85 through a turn buckle 86$^a$ and at the other end is fixedly mounted on the shaft 55$^a$ by means of a collar 87$^a$ and set screw 88$^a$. This shaft 55$^a$ is rocked by a cam arm 89$^a$ likewise secured to the shaft and extending to a cam 15$^b$ on one face of the gear wheel 15, as seen in Figs. 1 and 8. The path of this cam is so contoured that it gives the required reciprocation to the rack 85 at the proper time with relation to the other movements of the machine. If a constructor follows the contour and positioning of this cam 15$^b$ he will obtain this result. A stud 91$^a$ carried by the cam arm 89$^a$ rides in the cam groove 15$^b$. The two extreme positions of this operating mechanism are shown in Figs. 8 and 10.

We will now refer to the operating mechanism by which the mold locking bars 82 are actuated. See Figs. 1, 7, 11 and 12. As before stated, when each mold comes to the discharge position, the middle position of the three molds shown in Fig. 7, the mold is to be temporarily held or locked pending the withdrawal of the cores and cones and the return of the cores. Each mold has a trunnion indicated by the dotted lines at 35 in Fig. 7, over which the bifurcated end of the locking bar 82 fits. The mechanism now to be described swings these locking bars back and forth to present their bifurcated ends over the trunnions and to remove them therefrom. This mechanism consists of a yoke 82$^a$ connected to the bars 82, and a bell crank lever 83$^a$ connected to this yoke by a buckle 84$^a$. The bell crank lever is operated by the cam track 19$^b$ in the double cam 19. See Figs. 1 and 12. A machine made with the cam track 19$^b$ arranged and shaped as shown will so operate the mold locking bar 82 as to cause it to perform the functions above stated.

We will now refer to the mechanism which operates the slide 104 by which the grippers are raised and lowered to cause the gear wheel 117 and rack 118 to invert them. See Figs. 1, 13 and 14 for this mechanism. A link 104$^a$ is connected to the slide 104 and to a rocking arm 105$^a$ mounted on a shaft 106$^a$. In turn this rocking arm is attached through another link, 107$^a$, to a cam lever 108$^a$ mounted on the shaft 55$^a$. A pin 110$^a$ on this cam lever rides in the cam track 20$^a$ formed in the cam 20, as clearly seen in Fig. 14. It will now be understood that when these devices are operated by the cam and the slide given a downward movement it will draw the shaft 103 and the other parts heretofore described and thereby cause the gear 117 to roll in the rack 118 to lower and invert the grippers, as shown in Figs. 21 and 14. The cam track 20$^a$ as here shown will produce this motion when combined with the other devices shown.

We will now refer to the mechanism which actuates the devices which close the grippers (see Figs. 1 and 17), and which also presents a certain stop under the slide 104 to hold the grippers in their core and cone receiving position, as in Fig. 7. This mechanism comprises the cam track 20$^b$ and the cam lever 20$^c$ pivoted at 55$^a$. This lever connects through a pin 20$^e$ with a link 20$^f$ having a slot 20$^g$ to compensate for the arc movements. This link 20$^f$ is pivoted to a fixed bracket 20$^h$ and by a link 20$^i$ is connected with the slide 116. It will therefore be seen that when the lever 20$^c$ vibrates up and down it will appropriately move the slide 116 to cause it to elevate and lower the cross bar 113 which through its rollers 115 and wedge 114 will act on the cam horns 112 to release them to permit the springs 107 to open the gripper halves or on the cam horns to cause them to close the grippers through the rock shafts 100 and the supporting fingers 98, shown in Fig. 19. So much for adjusting the gripper closing devices, the cam track 20$^b$ when made as shown effecting these operations.

In order to sustain the slide 104 and through it the shaft 103 and the other connections with the grippers to maintain the grippers in their elevated position to receive the cones and the cores, the latch 104$^b$ is pivoted to a fixed projection 105$^b$ from the frame and adapted to be positioned under the slide 104 to hold it for the above purpose and to be removed from the slide when it is to be drawn downward to cause the inversion of the gripper halves. This latch 104$^b$ is operated by the sliding plate 104$^c$ to which it is pivoted at 104$^d$, a bell crank lever 104$^e$ being connected to the slide at 104$^f$ and operated on its pivot 104$^g$ by a link 104$^h$ which gets its motion from the movements of the said link 20$^f$. When the cam lever 20$^c$ moves downward at its left hand end, as seen in Fig. 17 it will cause the bell crank lever and the sliding plate 104$^c$ to present the latch 104$^b$ under the slide 104, and when said lever 20$^c$ is in its upper position at said end it will withdraw the latch from under said slide. The presence of the slot 104$^i$ in the link 104$^h$ permits the pin 104$^j$ to travel a short distance before the bell crank lever is actuated on the up-stroke of the cam lever 20$^c$, and in this way the proper time is secured for withdrawing the latch 104$^b$ from under the slide 104. A retracting spring 104$^k$ is connected at one end to the slide 104$^c$ and at the other end to a stud 104$^l$ and exerts a tendency on the slide 104$^c$ to shift the latch 104$^b$ under the slide 104 when the lever 20$^c$ in the other connections permit that movement. The slot 104$^m$ permits the slide 104$^c$ to move with reference to the stud 104$^l$.

Thus we have provided a form of mechanism by which the slide 104 and hence the grippers are held in core-receiving position and released therefrom and by which the gripper halves are permitted to come under the influence of the opening springs and are later made to close partially and fully during the movement of the cross bar 113 and its adjuncts.

In Fig. 31 we have shown on a larger scale the core-bar and the lifting mechanism for transferring it from the molds to the grippers and vice versa. On the member 66 are studs 173ª having pins 173ᵇ which travel in slots 173ᶜ formed in the presser levers 73 which operate the stripper plate 119. These pins guide the lower ends of these presser levers 73, and properly position them with respect to the studs 121 thereof.

It will now be observed that our invention adds to the combination comprised of the cores and grippers set forth in our former Patent No. 1,423,259, dated July 18, 1922, a stripper device or plate by which the cones are held to permit the withdrawal of the cores;

That this new combination also includes a presser device for acting on the stripper or plate to hold it in position while the core bar and its cores recede from the stripper;

That the present invention also adds to the combination of strippers and trimmers a scraper by which the fragments of baked batter are removed when the punches recede from the die of the trimmer;

That the present improvements also add to the former invention the new combination of the trimmer punches, the scraper which accompanies them and a single mechanism which operates to position the punches and scraper to and from the scrapers;

Also that the present invention adds to the former one the new combination of the trimmer punches and scrapers which act to dislodge from the punches any adhering fragments of baked batter so as to keep the punches in a clean state for the better performance of their function;

That the present invention also improves the mechanism and method for lifting and moving the cores from the molds to the grippers and from the grippers back to the molds by the provision of an additional set of devices for moving the core transferring carriage through its guiding ways as it is made to travel from a position over the molds to a position over the grippers and back again, so that the carriage is more easily and effectively carried through these motions;

Further that the grippers of the former patent are changed from clamping the cones to permit the withdrawal of the cores to merely holding the cones as the stripper prevents them from following the withdrawing cores.

Again, that the present grippers have a new mode of discharging the cones consisting in the inversion of the grippers in connection with their opening, so that the cones rapidly discharge from the grippers without the larger end of the cones having to pass through the small end of the grippers, a result of their inversion;

Also that in the present invention there are features of organization combined with the grippers whereby they are supported, carried downward and inverted;

That the present invention also includes certain stop devices for the molds whereby when they come to the unloading position, such stops present themselves across the path of movement of the molds and arrest them in that position, pending their being unloaded and pending the return to them of the cores after they have withdrawn from the cones.

Further that the present invention embraces a number of cams each combined with a lever operated thereby and with connections between such lever and the particular device of the machine to be operated, as the core lifting carriage which has its cam and lever mechanism, the mold stop devices which have their cam and lever mechanism, the inverting grippers which have their cam and operating mechanism, and the closing mechanism for the grippers which has a cam and lever actuator.

We are operating machines from which the drawings were made and have found the features of the present invention to be practical, useful and efficient in the performance of their several and respective functions, so that while the foundation machine is embraced and set forth in the specification and claims of our former Patent No. 1,423,259, the added features and improvements embodied in the machine of the present invention enhance the value and effectiveness of the machine as a whole.

Having thus fully described our invention, what we claim as new and desire to secure by Letters Patent, is:—

1. In a cone making machine, the combination with a cone-forming unit comprising a solid mold with cavities and corresponding cores, of cone grippers comprising members adapted to receive the cores with their impaled cones, mechanism to withdraw the cores and impaled cones from the mold, insert them into the grippers and return the cores to the mold, and a stripper which retains the cones in the grippers while the cores withdraw.

2. In a cone making machine, the combination with a cone-forming unit comprising a solid mold with cavities, and corresponding cores, of cone grippers comprising adjustable members adapted to receive and discharge the cones, mechanism to hold the mold stationary momentarily, mechanism to remove the cores with the cones impaled thereon from the mold and to cause the cores and cones to enter the grippers and the cores to withdraw therefrom and reenter the mold, a stripper to strip the cones from the withdrawing cores, and means to cause the grippers to discharge the cones during the interval between the departure and return of the cores.

3. In a cone making machine, the combination with a solid mold and corresponding cores, of grippers comprising movable members, mechanism to remove the cores with the cones impaled thereon from the mold, to insert them in the grippers and return the cores to the mold, and a stripper to strip the cones from the cores as they withdraw from the grippers, and means to invert the grippers to discharge the cones.

4. In a cone making machine, the combination with a solid mold and cone grippers in convenient juxtaposition therewith, the grippers comprising operable members for receiving and releasing the cones, of cores corresponding with the mold cavities and mechanism adapted to automatically engage with the cores and remove them from the mold with the cones impaled thereon, to thence travel with the cones into the grippers and back again from the grippers to the mold after the cores sever connection with the cones, and a stripper to strip the cones from the cores as the latter withdraw from the grippers.

5. In a cone making machine, the combination with a cone-forming unit comprising a solid mold with cavities and corresponding cores, of cone grippers comprising members adapted to receive the cores with their impaled cones, mechanism to withdraw the cores and impaled cones from the mold, insert them into the grippers and return the cores to the mold, a stripper to strip the cones from the cores as the latter withdraw from the grippers, and trimming mechanism adapted to trim the cones at a time between the withdrawal of the cores and the discharge of the cones from the grippers.

6. In a cone making machine, the combination with a cone-forming unit comprising a solid mold with cavities, and corresponding cores, of cone grippers comprising adjustable members adapted to receive and discharge the cones, mechanism to hold the mold stationary momentarily, mechanism to remove the cores with the cones impaled thereon from the mold and to cause the cores and cones to enter the grippers and the cores to withdraw therefrom to reenter the mold, a stripper to strip the cones from the cores as the latter withdraw from the grippers, means to cause the grippers to discharge the cones during the interval between the departure and return of the cores, and trimming mechanism adapted to trim the cones at a time between the withdrawal of the cores and the discharge of the cones from the grippers.

7. In a cone making machine, the combination with a solid mold and corresponding cores, of devices to momentarily hold the mold stationary, and mechanism adapted to remove the cores with their impaled cones from the mold, to deliver the cores with such cones to a point somewhat remote from the mold for the discharge of the cones and to return the cores into the mold, and a stripper to strip the cones from the cores at said point.

8. In a cone-making machine, the combination with a core unit and a stripper carried thereby, the cores and stripper adapted to have relative movement, of a presser device for holding the stripper in a position where it will engage with cones on the cores, said presser device being movable with the cores and spring mechanism between the presser and stripper, whereby the cores may be severed from the cones and withdrawn.

9. In a cone-making machine, the combination with a core unit and a stripper carried thereby, the cores and stripper adapted to have relative movement, of a presser device for holding the stripper in a position where it will engage with cones on the cores, and grippers adapted to receive and hold the cones while the stripper is acting on them during the withdrawal of the cores.

10. In a cone-making machine, the combination with a core unit and a stripper carried thereby, of means to lift the core and impaled cones from one position to another and a presser device adapted to act on the stripper to cause it to hold the cones while the cores withdraw, such stripper coming into such action at the place to which the cores within the impaled cones have been delivered by said mechanism.

11. In a cone making machine, the combination with a solid mold and devices to hold it momentarily stationary, of corresponding cores and core actuating mechanism comprising ways, a carriage adapted to travel therein, a lifting device mounted on the carriage, means to cause the lifting device to engage with and disengage from the core bar, and operating devices to cause the carriage to travel in the ways comprising a plurality of gears at each side of the machine, each gear having means to engage the carriage and carry it through its ways and a rack to operate the gears at each side of the machine so that all the gears will be effective in moving the carriage, whereby the carriage will travel the more smoothly and readily through its ways.

12. In a cone making machine, the combination with arches, one at each side of the machine and each having a plurality of ways, of a gear wheel operating in conjunction with each way, means to actuate said gears and a carriage mounted to travel in said ways, and a connection between each gear and the carriage so that the carriage is under the control of all of the gears.

13. In a cone making machine, the combination with a core unit comprising a solid mold and cores therefor, a stripper carried by the cores and grippers adapted to receive the cores and impaled cones, of a carriage adapted to remove the cores and cones from the mold and insert them in the grippers, means to operate such carriage, and a presser device carried by the carriage and adapted to act on the stripper while the cores withdraw from the cones in the grippers.

14. In a cone making machine, the combination with cores and a stripper, of a trimmer and a scraper, the stripper acting to hold the cones while the cores withdraw, the trimmer acting to remove from the cones the surplus edges and the scraper acting to remove the surplus material left by the action of the trimmer.

15. In a cone making machine, the combination with cones and a stripper, of a trimmer comprising dies and punches, and a scraper connected with the dies, and mechanism to actuate the punches and scraper to cause the punches to enter into and recede from the dies and the scraper to remove surplus material from the dies following the withdrawal of the punches.

16. In a cone making machine, the combination with a trimmer comprising dies and punches and a scraper to scrape the die plate, of operating mechanism for the punches and scraper comprising a supporting device for the punches and scraper and actuating devices to position the support to insert and remove the punches in and from the dies and to drag the scraper across the die plate.

17. In a cone making machine, the combination with a trimmer comprising dies and punches, of two scrapers, one for scraping the die plate and the other for scraping the punches.

18. In a cone making machine, the combination with a trimmer comprising dies and punches, of a scraper for the dies operable with the punches and stationary scrapers for removing material from the punches, and mechanism to position and operate the punches and die plate scraper.

19. In a cone making machine, the combination with a mold, and cores for molding a cone, means for trimming the cone, comprising dies and punches, of a scraper for acting on the punches to remove adhering material therefrom.

20. In a cone making machine, the combination with a solid mold and cores adapted to withdraw from the molds with cones impaled thereon, of grippers adapted to receive the cores and impaled cones, and devices to open and invert the grippers to discharge the cones.

21. In a cone making machine, the combination with solid molds and cores therefor adapted to withdraw with the cones impaled thereon, of grippers adapted to receive the cores with their impaled cones, means to transfer the cores from the molds to the grippers, a stripper for each core unit adapted to retain the cones in the grippers as the cores withdraw, and mechanism to open and invert the grippers for the discharge of the cones.

22. In a cone making machine, the combination with grippers, of devices adapted to invert the grippers to cause them to discharge their contents.

23. In a cone making machine, the combination with grippers adapted to open and close, of devices to close them, other devices to open them and other devices to invert them.

24. In a cone making machine, the combination with grippers formed in halves, supports therefor, cam devices to close them partially and wholly, spring devices to open them and rotary devices to lower and invert them.

25. In a cone making machine, the combination with a frame, gripper halves mounted therein, yoke devices to maintain and adjust the halves, fingers connected to the yoke devices, cam devices to cause the fingers to maintain the molds closed, spring devices to open the molds when the cam devices are adjusted to release the fingers, shafts to support the fingers, plates carrying the shafts, a guide for the plates to slide on, a shaft, a gear and a rack to slide the plates and invert the fingers and grippers.

26. In a cone making machine, the combination with grippers, means to open them, means to close them, and means to invert and revert them.

27. In a cone making machine, the combination with grippers, means to open them, means to close them and means to invert and revert them, of cores adapted to enter such grippers with cones impaled thereon, and a stripper to part the cones from the cores when the latter are being withdrawn from the grippers.

28. In a cone making machine, the combination with solid molds and cores therefor, of grippers adapted to receive the cores with cones impaled thereon, means to transfer the cores with the cones from the molds to the grippers, a stripper to strip the cones from the cores, a trimmer mounted near the grippers, and means to invert the grippers after the cores have withdrawn and the trimmers have functioned.

29. In a cone making machine, the combination with molds, a channel-guide and stop devices in said channel-guide adapted to arrest the molds at their unloading point, and means to present the stops in position when the molds arrive and to withdraw the stops when the molds are to move on, and means to so operate the molds.

30. In a cone making machine, the combination with a carriage adapted to transfer a core unit having cones on the cores from one position to another, of a trimmer comprising a stationary and a movable member, means to support and present the trimmer to and from operative position, and a connection between such means and said carriage, whereby the trimmer may act in sequence with the cores.

31. In a cone making machine, the combination with solid molds, cores therefor adapted to withdraw from the molds with the cones impaled thereon, a stripper to strip the cones from the cores, grippers and trimmers, of a carriage and mechanism to operate it to cause the carriage to remove the cores from the molds to the grippers, a presser device to act on the stripper, a support for the movable member of the trimmer, and actuating means for said support connected to the carriage.

32. In a cone making machine, the combination with a trimmer comprising dies and punches, and a scraper for the die plate, of a supporting arm for the punches and scraper, a slidable bar adapted to actuate the support to change its altitude, and means to swing such bar to different lateral positions to cause the support to carry the punches and scrapers to and from the die plate.

33. In a cone making machine, the combination with elements having guideways, a carriage mounted to travel therein and mechanism comprising a plurality of gear wheels mounted in each of said elements and having connections with the carriage to manipulate it, of devices to operate said gear wheels, a lever connected with said devices and a cam having a track with which said lever engages to produce the necessary operative movements.

34. In a cone making machine, the combination with a trimmer, a scraper and a support therefor, of a slidable bar connected with said support, toggle mechanism connected to said bar, of a lever attached to the toggle mechanism and a second lever connected to the first one and a cam having a track with which the last named lever engages to produce the required motion in the toggle.

35. In a cone making machine, the combination with grippers and their mountings, means to invert and revert the grippers and a slide to cause inverting and reverting means to operate, of a lever connected to the slide and a cam having a track with which the lever engages to produce the operative movements in the slide.

36. In a cone making machine, the combination with a double series of grippers, and supports therefor, of slidable means in which said supports are mounted, and rotatable means to invert and revert the slidable means, whereby the grippers are inverted and reverted.

37. In a cone making machine, the combination with a mold guiding track and a mold operated therein, of mold stops projectable into said tracks adapted to engage the mold when it reaches a loading station, a lever connected with said stops by intermediate devices, and a cam having a track with which said lever engages to produce the necessary operative movements.

38. In a cone making machine, the combination with grippers and a slide connected thereto, of a latch adapted to be adjusted to support and release said slide, a lever, and intermediate devices connecting it to said latch, and a cam having a track with which said lever engages to produce the operative movements to operate the latch.

39. In a cone making machine, the combination with grippers and cam devices to close the same, of means to act on the cam devices including a slidable bar, a lever, intermediate devices connecting said lever with said bar, and a cam having a track with which the lever engages to produce operative movements required on the part of the bar to actuate the means for engaging the cam surfaces.

40. In a cone making machine, the combination with a mold, a track with side walls for guiding the motions of the mold and a locking bar therefor, said bar having means adapted to enter the track to engage the mold to hold it in unloading position and to release it to permit the mold to move on, of a bell crank lever, connections between one end of said lever and said bar and a cam having a track with which the other end of the lever engages to produce the operative movements.

In testimony whereof, we affix our signatures.

WEBSTER M. ROBERTS.
PARK D. ROBERTS.